United States Patent
Liao et al.

(10) Patent No.: US 11,968,360 B2
(45) Date of Patent: Apr. 23, 2024

(54) METHODS FOR PALETTE PREDICTION

(71) Applicant: ALIBABA GROUP HOLDING LIMITED, Grand Cayman (KY)

(72) Inventors: Ru-Ling Liao, Beijing (CN); Mohammed Golam Sarwer, Cupertino, CA (US); Yan Ye, San Diego, CA (US); Xuan Huang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/218,655

(22) Filed: Mar. 31, 2021

(65) Prior Publication Data
US 2021/0306627 A1    Sep. 30, 2021

Related U.S. Application Data

(60) Provisional application No. 63/005,305, filed on Apr. 4, 2020, provisional application No. 63/002,594, filed on Mar. 31, 2020.

(51) Int. Cl.
| | | |
|---|---|---|
| *H04N 19/117* | (2014.01) | |
| *H04N 19/105* | (2014.01) | |
| *H04N 19/176* | (2014.01) | |
| *H04N 19/186* | (2014.01) | |
| *H04N 19/46* | (2014.01) | |
| *H04N 19/80* | (2014.01) | |

(52) U.S. Cl.
CPC ......... *H04N 19/117* (2014.11); *H04N 19/105* (2014.11); *H04N 19/176* (2014.11); *H04N 19/186* (2014.11); *H04N 19/46* (2014.11); *H04N 19/80* (2014.11)

(58) Field of Classification Search
None
See application file for complete search history.

(56) References Cited

U.S. PATENT DOCUMENTS

| | | | | |
|---|---|---|---|---|
| 2013/0003829 A1* | 1/2013 | Misra | | H04N 19/91 |
| | | | | 375/E7.125 |
| 2014/0072237 A1* | 3/2014 | Tanizawa | | H04N 19/94 |
| | | | | 382/233 |

(Continued)

FOREIGN PATENT DOCUMENTS

| | | |
|---|---|---|
| WO | WO 2015/179898 A1 | 12/2015 |
| WO | WO 2021/202667 A1 | 10/2021 |

OTHER PUBLICATIONS

High Efficiency Video Coding, Rec. ITU-T H.265 and ISO/IEC 23008-2, Jan. 2013, 692 pages.

(Continued)

*Primary Examiner* — Talha M Nawaz
(74) *Attorney, Agent, or Firm* — Finnegan, Henderson, Farabow, Garrett & Dunner, LLP

(57) ABSTRACT

The present disclosure provides a computer-implemented method for encoding video. The method includes: receiving a video frame for processing; generating one or more coding units of the video frame; and processing one or more coding units using one or more palette predictors having palette entries, wherein each palette entry of the one or more palette predictors has a corresponding reuse flag, and wherein a number of reuse flags for each palette predictor is set to a fixed number for a corresponding coding unit.

20 Claims, 27 Drawing Sheets

(56) References Cited

U.S. PATENT DOCUMENTS

| | | | |
|---|---|---|---|
| 2014/0294078 A1 | 10/2014 | Seregin et al. | |
| 2015/0365671 A1* | 12/2015 | Pu | H04N 19/46 375/240.03 |
| 2015/0365695 A1* | 12/2015 | Pu | H04N 19/186 375/240.16 |
| 2017/0078683 A1* | 3/2017 | Seregin | H04N 19/463 |
| 2017/0195676 A1* | 7/2017 | Chuang | H04N 19/44 |
| 2018/0014034 A1* | 1/2018 | Lai | H04N 19/593 |
| 2018/0109798 A1* | 4/2018 | Lee | H04N 19/186 |
| 2020/0092546 A1* | 3/2020 | Ye | H04N 19/186 |
| 2020/0314423 A1* | 10/2020 | Hu | H04N 19/96 |
| 2021/0051336 A1* | 2/2021 | Chao | H04N 19/1883 |
| 2021/0092393 A1* | 3/2021 | Chao | H04N 19/50 |
| 2021/0321141 A1* | 10/2021 | Jang | H04N 19/117 |
| 2022/0159241 A1* | 5/2022 | Zhu | H04N 19/132 |
| 2022/0182636 A1* | 6/2022 | Zhu | H04N 19/186 |

OTHER PUBLICATIONS

G.J. Sullivan, J.R. Ohm, W.J. Han, T. Wiegand, "Overview of the high efficiency video coding (HEVC) standard," IEEE Transactions on Circuits and Systems for Video Technology, vol. 22, No. 12, pp. 1649-1668, Dec. 2012.

JEM, https://jvet.hhi.fraunhofer.de/svn/svn_HMJEMSoftware.

J. Chen, E. Alshina, G. J. Sullivan, J.-R. Ohm, J. Boyce, "Algorithm description of Joint Exploration Test Model 7 (JEM7)", JVET-G1001, Jul. 2017, 50 pages.

A. Segall, V. Baroncini, J. Boyce, J. Chen, and T. Suzuki, "Joint Call for Proposals on Video Compression with Capability beyond HEVC," JVET-H1002 (v6), Oct. 2017, 27 pages.

J. Chen, Y. Ye, S. H. Kim, "Algorithm description for Versatile Video Coding and Test Model 8 (VTM 8)" JVET-Q2002, Jan. 2020, 91 pages.

B. Bross, J. Chen, S. Liu, Y.-K. Wang, "Versatile Video Coding (Draft 8)", JVET-Q2001, Jan. 2020, 509 pages.

Y.-H. Chao, C.-H. Hung, W.-J. Chien, T. Hsieh, M. Karczewicz, "CE8-1.3: Line-based CG Palette Mode", JVET-P0077, Geneva, Oct. 2019, 6 pages.

PCT International Search Report and Written Opinion dated Aug. 10, 2021, issued in corresponding International Application No. PCT/US2021/025092 (10 pgs.).

European Patent Office Communication issued for Application No. 21780078.8 the Supplementary European Search Report (Art. 153(7) EPC) and the European search opinion dated Mar. 14, 2024, 11 pages.

Bross et al., "Versatile Video Coding (Draft 8)," JVET-Q2001-vE, 17th Meeting: Brussels, BE, Jan. 7-17, 2020, 510 pages.

Chao et al., "Non-CE8: Simplification of palette predictor update for small CUs," JVET-P0475, 16th Meeting: Geneva, CH, Oct. 1-11, 2019, 4 pages.

Liao et al., "AHG11: Fixed number of reuse flags for palette mode," JVET-R0229, 18th Meeting: by teleconference, Apr. 15-24, 2020, 4 pages.

Liao et al., "AHG11: Bugfix to deblocking filter boundary strength setting for palette," JVET-R0228, 18th Meeting: by teleconference, Apr. 15-24, 2020, 8 pages.

\* cited by examiner

Example of a block coded in palette mode

| | Descriptor |
|---|---|
| palette_coding( x0, y0, cbWidth, cbHeight, treeType ) { | |
|   startComp = ( treeType == DUAL_TREE_CHROMA ) ? 1 : 0 | |
|   numComps = ( treeType == SINGLE_TREE ) ? ( ChromaArrayType == 0 ? 1 : 3 ) : ( treeType == DUAL_TREE_CHROMA ) ? 2 : 1 | |
|   maxNumPaletteEntries = ( treeType == SINGLE_TREE ) ? 31 : 15 | |
|   palettePredictionFinished = 0 | |
|   NumPredictedPaletteEntries = 0 | |
|   for( predictorEntryIdx = 0; predictorEntryIdx < PredictorPaletteSize[ startComp ] && !palettePredictionFinished && NumPredictedPaletteEntries < maxNumPaletteEntries; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < maxNumPaletteEntries ) | |
|     num_signalled_palette_entries | ae(v) |
|   for( cIdx = startComp; cIdx < ( startComp + numComps ); cIdx++ ) | |
|     for( i = 0; i < num_signalled_palette_entries; i++ ) | |
|       new_palette_entries[ cIdx ][ i ] | ae(v) |

```
┌─────────────────────────────────────────────┐
│ Adding all palette entries of a current     │  ← 802
│ palette as a first set of entries of the    │
│ palette predictor.                          │
└─────────────────────────────────────────────┘
                      │
┌─────────────────────────────────────────────┐
│ Adding palette entries from a previous      │  ← 804
│ palette predictor regardless of a value of  │
│ the reuse flag, as a second set of entries  │
│ of the palette predictor, wherein the       │
│ second set of entries are after the         │
│ first set of entries.                       │
└─────────────────────────────────────────────┘
```

FIG. 8

| | |
|---|---|
| When one of the following conditions is true: | |
| - cIdx is equal to 0 and numComps is equal to 1; | |
| - cIdx is equal to 2; | |
| the value PredictorPaletteSize[ startComp ] and the array PredictorPaletteEntries are derived or modified as follows: | |
| for( i = 0; i < CurrentPaletteSize[ startComp ]; i++ ) | |
|    for( cIdx = startComp; cIdx < (startComp + numComps ); cIdx++ ) | |
|       newPredictorPaletteEntries[ cIdx ][ i ] = CurrentPaletteEntries[ cIdx ][ i ] | |
| newPredictorPaletteSize = CurrentPaletteSize[ startComp ] | |
| for( i = 0; i < PredictorPaletteSize[ startComp ] && newPredictorPaletteSize < maxNumPalettePredictorSize; i++ ) | |
|    if( !PalettePredictorEntryReuseFlags[ i ] ) { | |
|       for( cIdx = startComp; cIdx < (startComp + numComps ); cIdx++ ) | (457) |
|          newPredictorPaletteEntries[ cIdx ][ newPredictorPaletteSize ] = PredictorPaletteEntries[ cIdx ][ i ] | |
|       newPredictorPaletteSize++ | |
|    } | |
| for( cIdx = startComp; cIdx < ( startComp + numComps ); cIdx++ ) | |
|    for( i = 0; i < newPredictorPaletteSize; i++ ) | |
|       PredictorPaletteEntries[ cIdx ][ i ] = newPredictorPaletteEntries[ cIdx ][ i ] | |
| PredictorPaletteSize[ startComp ] = newPredictorPaletteSize | |
| When qtbtt_dual_tree_intra_flag is equal to 0 or slice_type is not equal to I, the following applies: | |
| PredictorPaletteSize[ 1 ] = newPredictorPaletteSize | (458) |
| It is a requirement of bitstream conformance that the value of PredictorPaletteSize[ startComp ] shall be in the range of 0 to maxNumPalettePredictorSize, inclusive. | |

FIG. 10

| | |
|---|---|
| When one of the following conditions is true: | |
|   – cIdx is equal to 0 and numComps is equal to 1; | |
|   – cIdx is equal to 2; | |
| the value PredictorPaletteSize[ startComp ] and the array PredictorPaletteEntries are derived or modified as follows: | |
| for( i = 0; i < CurrentPaletteSize[ startComp ]; i++ ) | |
|   for( cIdx = startComp; cIdx < ( startComp + numComps ); cIdx++ ) | |
|     newPredictorPaletteEntries[ cIdx ][ i ] = CurrentPaletteEntries[ cIdx ][ i ] | |
| newPredictorPaletteSize = CurrentPaletteSize[ startComp ] | |
| for( i = 0; i < PredictorPaletteSize[ startComp ] && newPredictorPaletteSize < maxNumPalettePredictorSize; i++) | |
| ~~if( !PalettePredictorEntryReuseFlag[ i ] ) {~~ (1101) | |
| ~~for( cIdx = startComp; cIdx < ( startComp + numComps ); cIdx++ )~~ | (7-157) |
|     newPredictorPaletteEntries[ cIdx ][ newPredictorPaletteSize ] = | |
|     PredictorPaletteEntries[ cIdx ][ i ] | |
|   newPredictorPaletteSize++ | |
| ~~}~~ (1101) | |
| ~~for( cIdx = startComp; cIdx < ( startComp + numComps ); cIdx++ )~~ | |
|   for( i = 0; i < newPredictorPaletteSize; i++ ) | |
|     PredictorPaletteEntries[ cIdx ][ i ] = newPredictorPaletteEntries[ cIdx ][ i ] | |
| PredictorPaletteSize[ startComp ] = newPredictorPaletteSize | |
| When qtbtt_dual_tree_intra_flag is equal to 0 or slice_type is not equal to I, the following applies: | |
| PredictorPaletteSize[ 1 ] = newPredictorPaletteSize | (458) |
| It is a requirement of bitstream conformance that the value of PredictorPaletteSize[ startComp ] shall be in the range of 0 to maxNumPalettePredictorSize, inclusive. | |

| | |
|---|---|
| Outputs of this process are initialized CABAC internal variables. | |
| The context variables of the arithmetic decoding engine are initialized as follows: | |
|    If the CTU is the first CTU in a slice or tile, the initialization process for context variables is invoked as specified in clause 9.3.2.2 and the array PredictorPaletteSize[ chType ], with chType = 0, 1, is initialized to 0. | |
|    Otherwise, if sps_entropy_coding_sync_enabled_flag is equal to 1 and CtbAddrX is equal to CtbToTileColBd[ CtbAddrX ], the following applies: | |
|       The location ( xNbT, yNbT ) of the top-left luma sample of the spatial neighbouring block T (Figure 12) is derived using the location ( x0, y0 ) of the top-left luma sample of the current CTB as follows: | |
|       ( xNbT, yNbT ) = ( x0, y0 − CtbSizeY ) | (1538) |
|       The derivation process for neighbouring block availability as specified in clause 6.4.4 is invoked with the location ( xCurr, yCurr ) set equal to ( x0, y0 ), the neighbouring location ( xNbY, yNbY ) set equal to ( xNbT, yNbT ), checkPredModeY set equal to FALSE, and cIdx set equal to 0 as inputs, and the output is assigned to availableFlagT. | |
|       The synchronization process for context variables is invoked as follows: | |
|          If availableFlagT is equal to 1, the following applies: | |
|             The synchronization process for context variables as specified in clause 9.3.2.4 is invoked with TableStateIdx0Wpp, TableStateIdx1Wpp, TableMpsValWpp as inputs. | |
|             When sps_palette_enabled_flag is equal to 1, the synchronization process for palette predictor as specified in clause 9.3.2.7 is invoked. | |
|          Otherwise, the initialization process for context variables is invoked as specified in clause 9.3.2.2 and the array PredictorPaletteSize[ chType ], with chType = 0, 1, is initialized to 0. | |
|    Otherwise, the initialization process for context variables is invoked as specified in clause 9.3.2.2 and the array PredictorPaletteSize[ chType ], with chType = 0, 1, is initialized to 0. | |

Palette predictor for 1st block

| Count | Comp1 | Comp2 | Comp3 | Reuse |
|---|---|---|---|---|
| 0 | A1 | A2 | A3 | 1 |
| 1 | B1 | B2 | B3 | 0 |
| 2 | C1 | C2 | C3 | 1 |
| 3 | D1 | D2 | D3 | 1 |
| 4 | E1 | E2 | E3 | 0 |

Current palette for 1st block

| Count | Comp1 | Comp2 | Comp3 |
|---|---|---|---|
| 0 | A1 | A2 | A3 |
| 1 | C1 | C2 | C3 |
| 2 | D1 | D2 | D3 |

Run length coding of reuse flags
0, 2, 0, 1

Palette predictor for 2nd block

| Count | Comp1 | Comp2 | Comp3 | Reuse |
|---|---|---|---|---|
| 0 | A1 | A2 | A3 | 0 |
| 1 | C1 | C2 | C3 | 0 |
| 2 | D1 | D2 | D3 | 0 |
| 3 | A1 | A2 | A3 | 0 |
| 4 | B1 | B2 | B3 | 1 |
| 5 | C1 | C2 | C3 | 0 |
| 6 | D1 | D2 | D3 | 0 |
| 7 | E1 | E2 | E3 | 0 |

Current palette for 2nd block

| Count | Comp1 | Comp2 | Comp3 |
|---|---|---|---|
| 0 | B1 | B2 | B3 |

Run length coding of reuse flags
5, 1 — 2101

| | |
|---|---|
| palette_predictor_run is used to determine the number of zeros that precede a non-zero entry in the array PalettePredictorEntryReuseFlags. | |
| It is a requirement of bitstream conformance that the value of palette_predictor_run shall be in the range of 0 to ( PredictorPaletteSize[ startComp ] − predictorEntryIdx ), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to maxNumPaletteEntries, inclusive. | |
| … | |

METHODS FOR PALETTE PREDICTION

CROSS-REFERENCE TO RELATED APPLICATIONS

The disclosure claims the benefits of priority to U.S. Provisional Application No. 63/005,305, filed on Apr. 4, 2020, and U.S. Provisional Application No. 63/002,594, filed on Mar. 31, 2020, both of which are incorporated herein by reference in their entireties.

TECHNICAL FIELD

The present disclosure generally relates to video processing, and more particularly, to the use of palette mode in video encoding and decoding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a computer-implemented method for palette predictor. In some embodiments, the method includes: receiving a video frame for processing; generating one or more coding units of the video frame; and processing one or more coding units using one or more palette predictors having palette entries, wherein each palette entry of the one or more palette predictors has a corresponding reuse flag, and wherein a number of reuse flags for each palette predictor is set to a fixed number for a corresponding coding unit.

Embodiments of the present disclosure provide an apparatus. In some embodiments, the apparatus includes a memory figured to store instructions; and a processor coupled to the memory and configured to execute the instructions to cause the apparatus to perform: receiving a video frame for processing; generating one or more coding units of the video frame; and processing one or more coding units using one or more palette predictors having palette entries, wherein each palette entry of the one or more palette predictors has a corresponding reuse flag, and wherein a number of reuse flags for each palette predictor is set to a fixed number for a corresponding coding unit.

Embodiments of the present disclosure provide a non-transitory computer-readable storage medium that stores a set of instructions that is executable by one or more processors of an apparatus to cause the apparatus to initiate a method for performing video data processing. In some embodiments, the method includes: receiving a video frame for processing; generating one or more coding units of the video frame; and processing one or more coding units using one or more palette predictors having palette entries, wherein each palette entry of the one or more palette predictors has a corresponding reuse flag, and wherein a number of reuse flags for each palette predictor is set to a fixed number for a corresponding coding unit.

Embodiments of the present disclosure provide a computer-implemented method for deblocking filter of palette mode. In some embodiments, the method includes: receiving a video frame for processing; generating the one or more coding units for the video frame, wherein each coding unit of the one or more coding units has one or more coding blocks; and setting a boundary filter strength to 1 in response to at least a first coding block of two neighboring coding blocks being coded in palette mode and second coding block of the two neighboring coding blocks has a coding mode different from the palette mode.

Embodiments of the present disclosure provide an apparatus. In some embodiments, the apparatus includes a memory figured to store instructions; and a processor coupled to the memory and configured to execute the instructions to cause the apparatus to perform: receiving a video frame for processing; generating the one or more coding units for the video frame, wherein each coding unit of the one or more coding units has one or more coding blocks; and setting a boundary filter strength to 1 in response to at least a first coding block of two neighboring coding blocks being coded in palette mode and second coding block of the two neighboring coding blocks has a coding mode different from the palette mode.

Embodiments of the present disclosure provide a non-transitory computer-readable storage medium that stores a set of instructions that is executable by one or more processors of an apparatus to cause the apparatus to initiate a method for performing video data processing. In some embodiments, the method includes: receiving a video frame for processing; receiving a video frame for processing; generating the one or more coding units for the video frame, wherein each coding unit of the one or more coding units has one or more coding blocks; and setting a boundary filter strength to 1 in response to at least a first coding block of two neighboring coding blocks being coded in palette mode and second coding block of the two neighboring coding blocks has a coding mode different from the palette mode.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 shows an example palette coding syntax.

FIG. 8 shows a flow chart of a palette predictor updating process, according to some embodiments of the present disclosure.

FIG. 10 shows an example decoding process for palette mode.

FIG. 11 shows an example decoding process for palette mode, according to some embodiments of the present disclosure.

FIG. 14 shows an example palette coding syntax, according to some embodiments of the present disclosure.

FIG. 15 shows an example decoding process for palette mode, according to some embodiments of the present disclosure.

FIG. 17 shows an example decoding process for palette mode, according to some embodiments of the present disclosure.

FIG. 18 shows an example initializing process for palette mode.

FIG. 19 shows an example initializing process for palette mode, according to some embodiments of the present disclosure.

FIG. 20 shows an example of a palette predictor update and corresponding run length coding of the reuse flags.

FIG. 21 shows an example of a palette predictor update and corresponding run length coding of the reuse flags, according to some embodiments of the present disclosure.

FIG. 22 shows an example of a palette predictor update and corresponding run length coding of reuse flags, according to some embodiments of the present disclosure.

FIG. 23 shows an example palette coding syntax, according to some embodiments of the present disclosure.

FIG. 24 shows an example palette coding semantics.

FIG. 25 shows an example palette coding semantics, according to some embodiments of the present disclosure.

DETAILED DESCRIPTION

Figure 1:
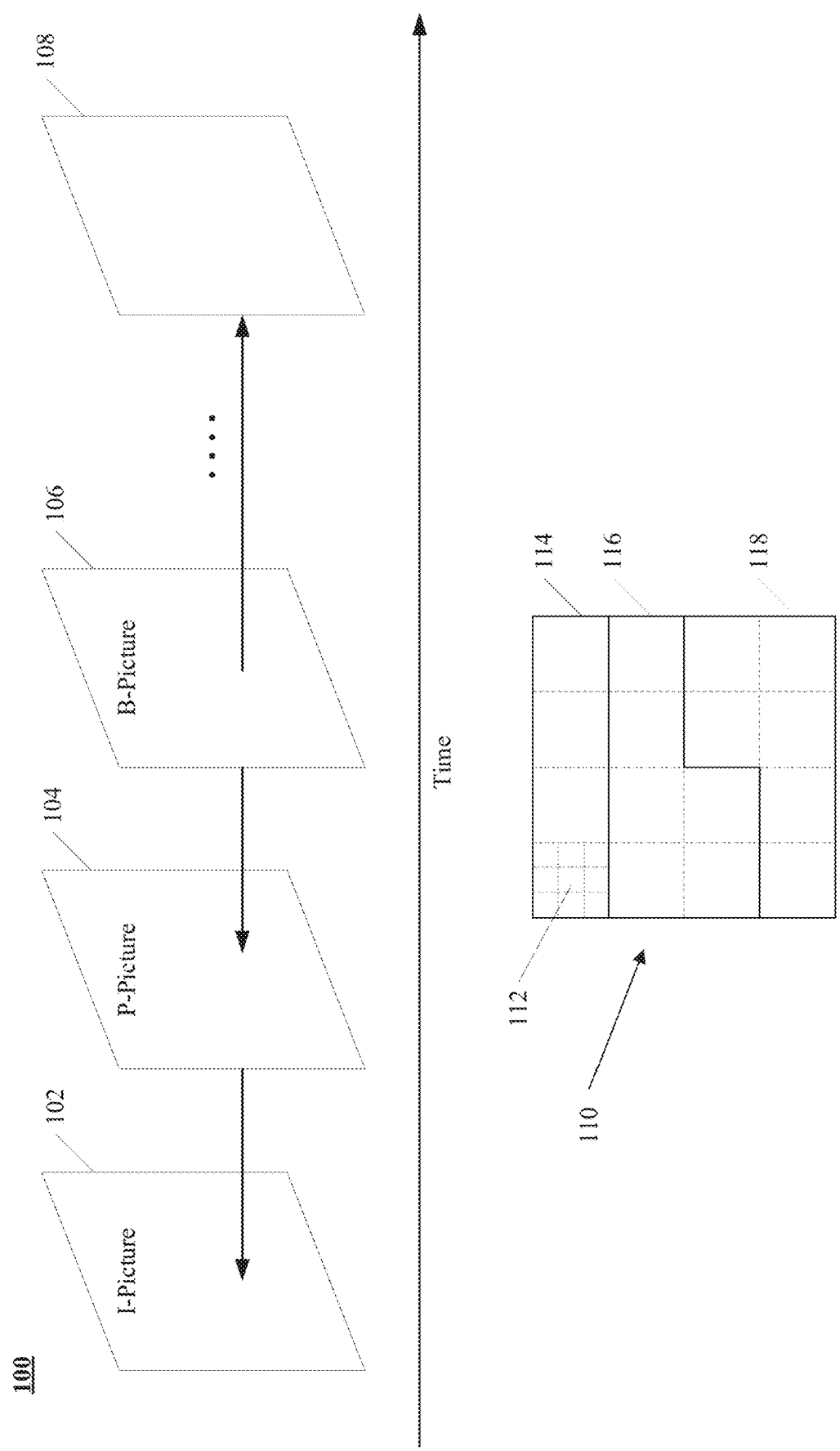
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16'16, 4-8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
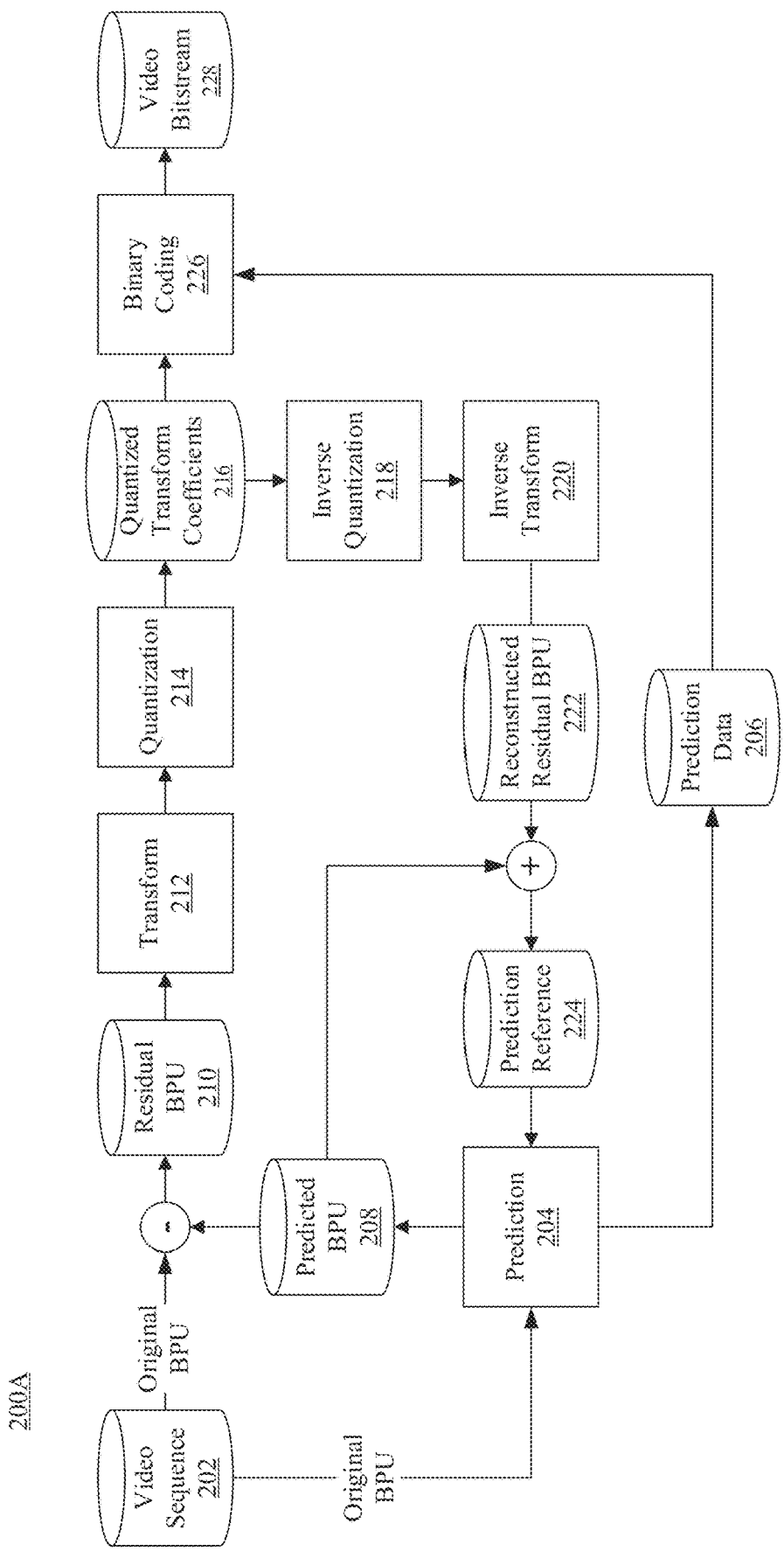
FIG. 2A is a schematic diagram illustrating an exemplary encoding process of a hybrid video coding system, consistent with embodiments of the disclosure.
Figure 2B:
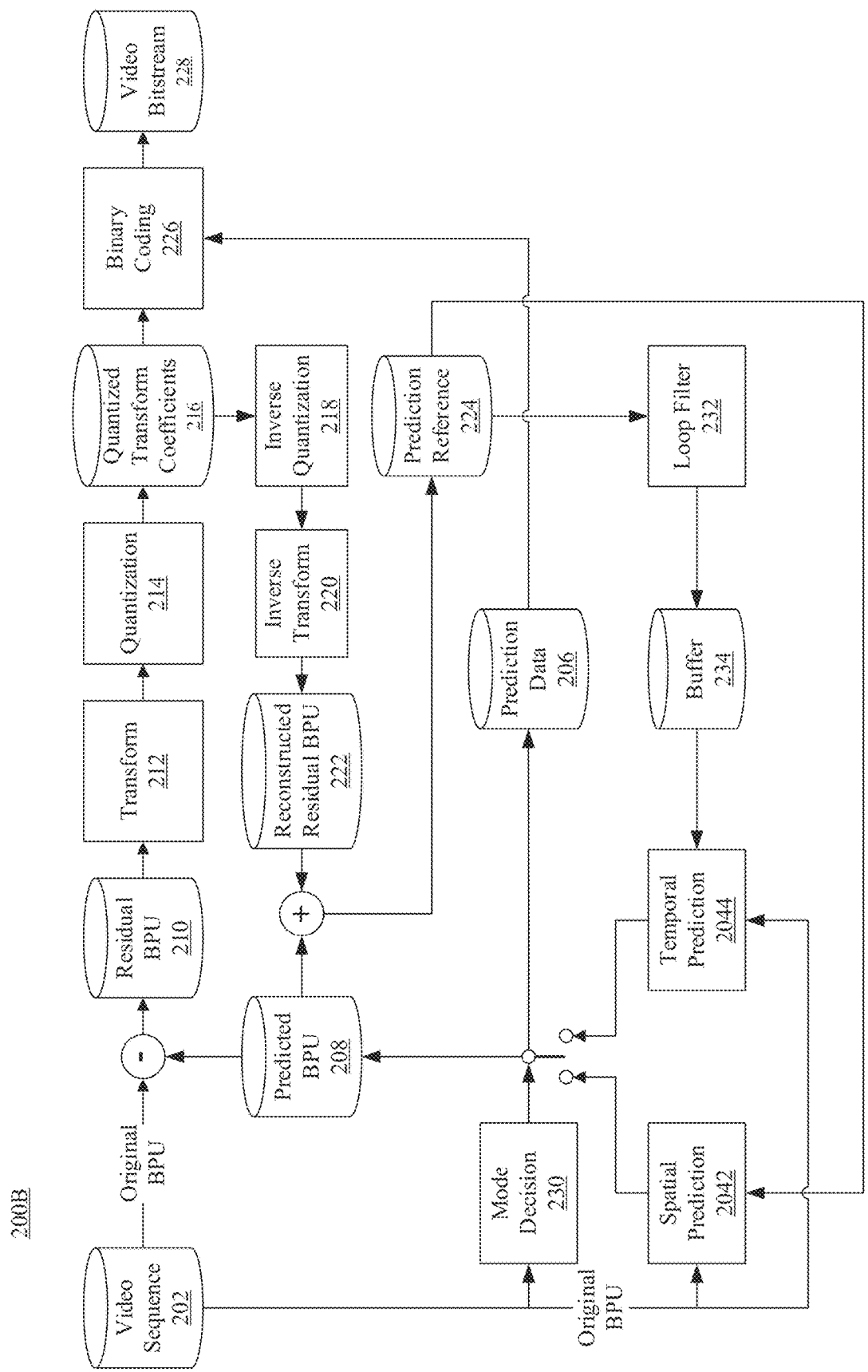
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266NVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
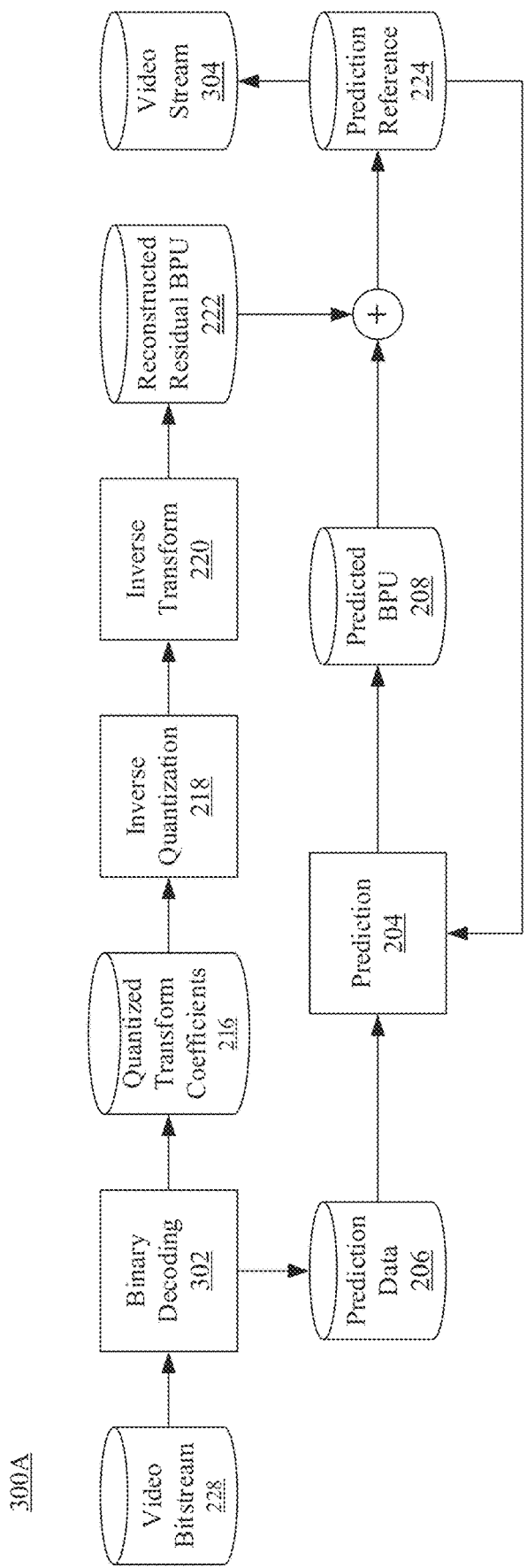
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
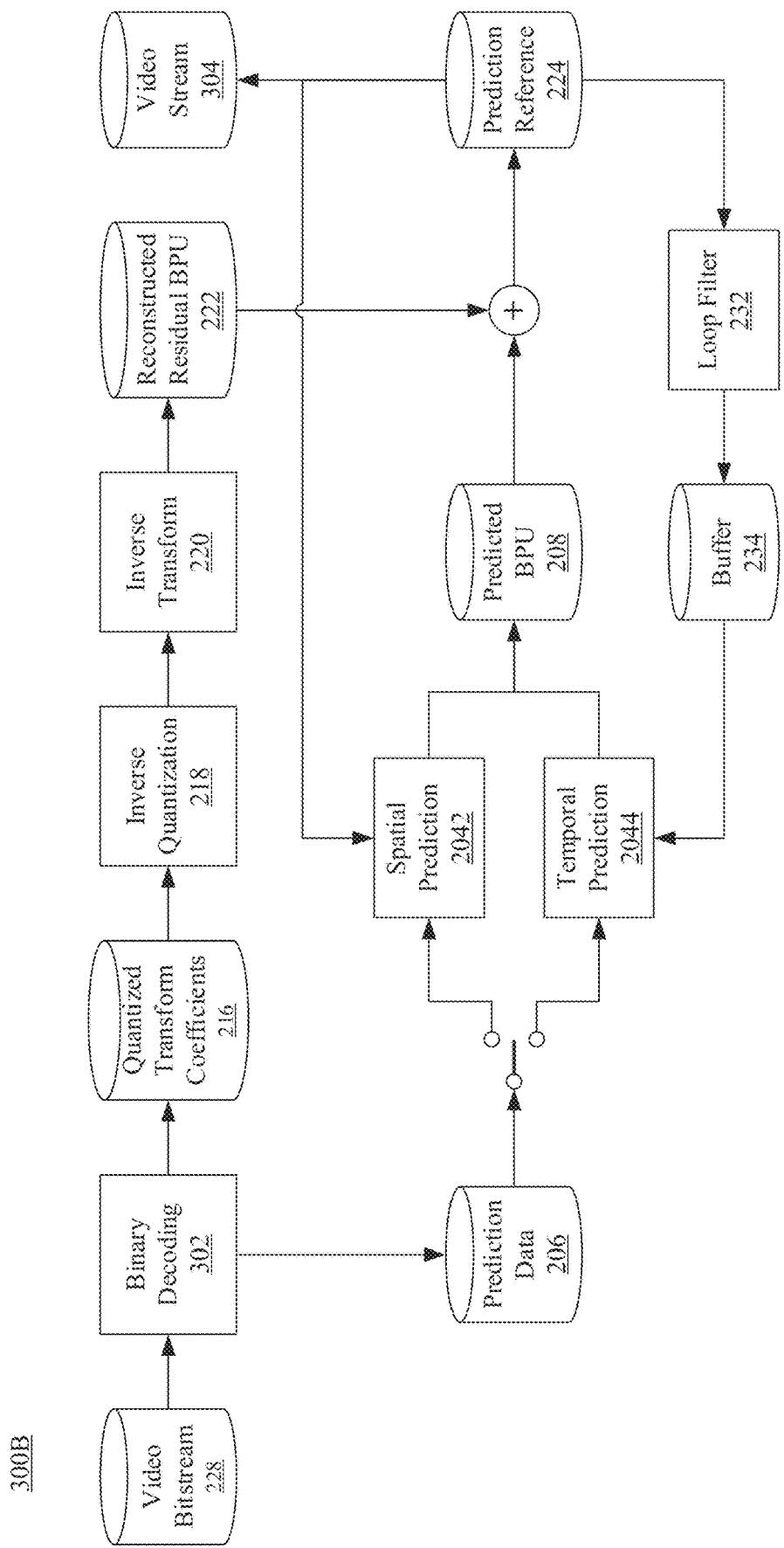
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
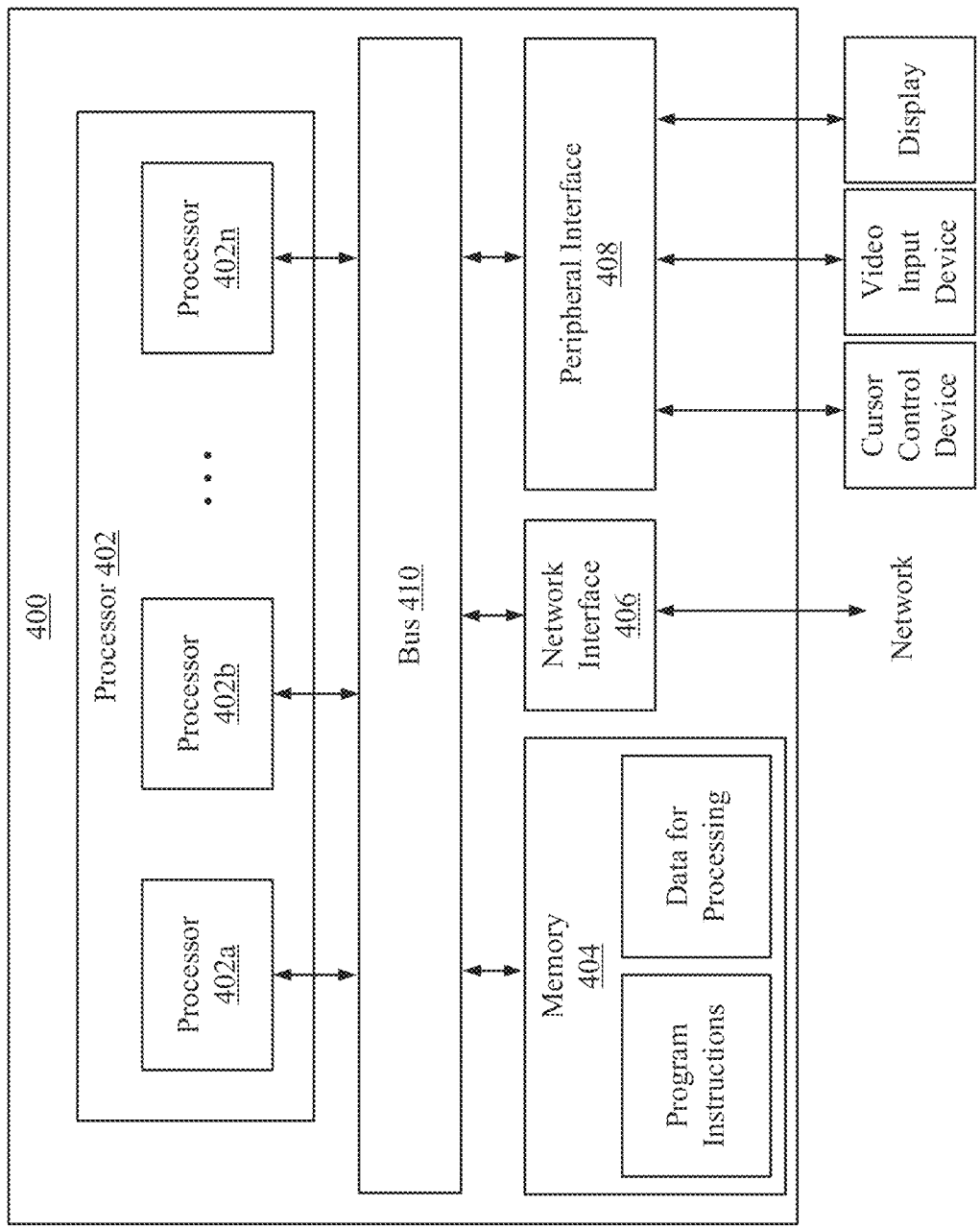
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
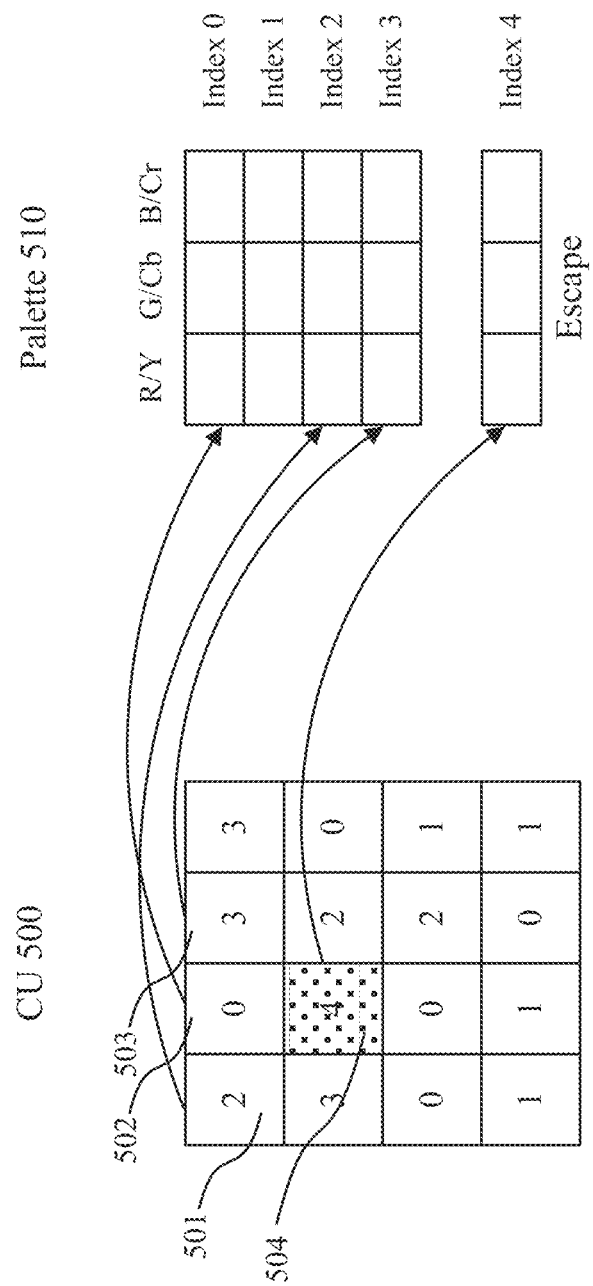
FIG. 5 shows an illustration of a block coded in palette mode, according to some embodiments of the present disclosure.

FIG. 5 shows an illustration of a CU coded in palette mode. In VVC draft 8, the palette mode can be used in monochrome, 4:2:0, 4:2:2 and 4:4:4 color formats. When palette mode is enabled, a flag is transmitted at the CU level if the CU size is smaller than or equal to 64×64 and is larger than 16 samples indicating whether palette mode is used. If the palette mode is utilized to code a (current) CU 500, the sample values in each position in the CU are represented by a small set of representative color values. The set is referred to as the palette 510. For sample positions with values close to the palette colors 501, 502, 503, the corresponding palette indices are signaled. It is also possible to specify a color value that is outside the palette by signaling an escape index 504. Then for all positions in the CU that use the escape color index, the (quantized) color component values are signaled for each of these positions.

Figure 6:
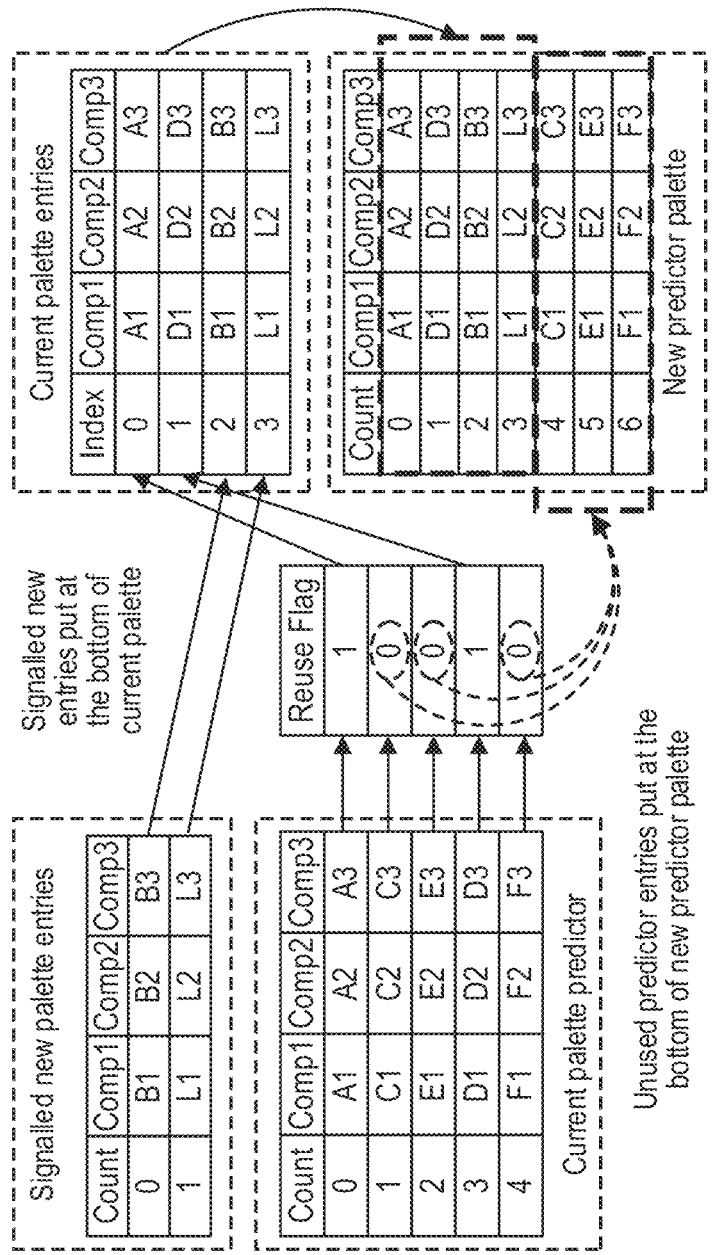
FIG. 6 shows an example of the palette predictor updating process.

For coding of the palette, a palette predictor is maintained. FIG. 6 shows an exemplary process for updating palette predictor after encoding each coding unit 600. The predictor is initialized to 0 (i.e., empty) at the beginning of each slice for non-wavefront cases and at the beginning of each CTU row for wavefront cases. For each entry in the palette predictor, a reuse flag is signaled to indicate whether it will be included in the current palette of the current CU. The reuse flags are sent using run-length coding of zeros. After this, the number of new palette entries and the component values for the new palette entries are signaled. After encoding the palette coded CU, the palette predictor will be updated using the current palette, and entries from the previous palette predictor that are not reused in the current palette are added at the end of the new palette predictor until the maximum size allowed is reached.

An escape flag is signaled for each CU to indicate if escape symbols are present in the current CU. If escape symbols are present, the palette table is augmented by one and the last index is assigned to be the escape symbol. Palette indices of samples in a CU form a palette index map, as shown in the example in FIG. 5. The index map is coded using horizontal or vertical traverse scans. The scan order is explicitly signaled in the bitstream using the palette_transpose_flag. The palette index map is coded using the index-run mode or the index-copy mode.

In VVC draft 8, a deblocking filter process includes defining a block boundary, deriving the boundary filtering strength based on the coding modes of two neighboring blocks along the defined block boundary, deriving the number of samples to be filtered and applying the deblocking filter to the samples. When an edge is a coding unit, coding subblock unit or a transform unit boundary, the edge is defined as a block boundary. Then, the boundary filtering strength is calculated based on the coding modes of two neighboring blocks according to the following 6 rules. (1) If both of two coding blocks are coded in BDPCM mode, the boundary filter strength is set to 0. (2) Otherwise, if one of the coding blocks is coded in intra mode, the boundary filter strength is set to 2. (3) Otherwise, if one of the coding blocks is coded in CIIP mode, the boundary filter strength is set to 2. (4) Otherwise, if one of the coding blocks contains one or more non-zero coefficient levels, the boundary filter strength is set to 1. (5) Otherwise, if one of the blocks is coded in IBC mode and the other block is coded in inter mode, the boundary filter strength is set to 1. (6) Otherwise (both two blocks are coded in IBC or inter modes), the reference pictures and motion vectors of two blocks are used to derive the boundary filter strength.

VVC draft 8 gives a more detailed description of the process of calculating the boundary filtering strength. Specifically, the VVC draft 8 gives eight sequential, exhaustive scenarios. In scenario 1, if cIdx is equal to 0 and both samples p0 and q0 are in a coding block with intra_bdpcm_luma_flag equal to 1, bS[xDi][yDj] is set equal to 0. Otherwise, in scenario 2, if cIdx is greater than 0 and both samples p0 and q0 are in a coding block with intra_bdpcm_chroma_flag equal to 1, bS[xDi][yDj] is set equal to 0. Otherwise, in scenario 3, if the sample p0 or q0 is in the coding block of a coding unit coded with intra prediction mode, bS[xDi][yDj] is set equal to 2. Otherwise, in scenario 4, if the block edge is also a coding block edge and the sample p0 or q0 is in a coding block with ciip_flag equal to 1, bS[xDi][yDj] is set equal to 2. Otherwise, in scenario 5, if the block edge is also a transform block edge and the sample p0 or q0 is in a transform block which contains one or more non-zero transform coefficient levels, bS[xDi][yDj] is set equal to 1. Otherwise, in scenario 6, if the prediction mode of the coding subblock containing the sample p0 is different from the prediction mode of the coding subblock containing the sample q0 (i.e. one of the coding subblock is coded in IBC prediction mode and the other is coded in inter prediction mode), bS[xDi][yDj] is set equal to 1.

Otherwise, in scenario 7, if cIdx is equal to 0, edgeFlags[xDi][yDj] is equal to 2, and one or more of the following conditions are true, bS[xDi][yDj] is set equal to 1.

Condition (1): the coding subblock containing the sample p0 and the coding subblock containing the sample q0 are both coded in IBC prediction mode, and the absolute difference between the horizontal or vertical component of the block vectors used in the prediction of the two coding subblocks is greater than or equal to 8 in units of 1/16 luma samples.

Condition (2): for the prediction of the coding subblock containing the sample p0 different reference pictures or a different number of motion vectors are used than for the prediction of the coding subblock containing the sample q0. For condition (2), note that the determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different. Also, for condition (2), note that the number of motion vectors that are used for the prediction of a coding subblock with top-left sample covering (xSb, ySb), is equal to PredFlagL0[xSb][ySb]+PredFlagL1[xSb][ySb].

Condition (3): one motion vector is used to predict the coding subblock containing the sample p0 and one motion vector is used to predict the coding subblock containing the sample q0, and the absolute difference between the horizontal or vertical component of the motion vectors used is greater than or equal to 8 in units of 1/16 luma samples.

Condition (4): two motion vectors and two different reference pictures are used to predict the coding subblock containing the sample p0, two motion vectors for the same two reference pictures are used to predict the coding subblock containing the sample q0 and the absolute difference between the horizontal or vertical component of the two motion vectors used in the prediction of the two coding subblocks for the same reference picture is greater than or equal to 8 in units of 1/16 luma samples.

Condition (5): two motion vectors for the same reference picture are used to predict the coding subblock containing the sample p0, two motion vectors for the same reference picture are used to predict the coding subblock containing the sample q0 and both of the following conditions are true. Condition (5.1): the absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples. Condition (5.2): the absolute difference between the horizontal or vertical component of list 0 motion vector used in the prediction of the coding subblock containing the sample p0 and the list 1 motion vector used in the prediction of the coding subblock containing the sample q0 is greater than or equal to 8 in units of 1/16 luma samples, or the absolute difference between the horizontal or vertical component of the list 1 motion vector used in the prediction of the coding subblock containing the sample p0 and list 0 motion vector used in the prediction of the coding subblock containing the sample q0 is greater than or equal to 8 in units of 1/16 luma samples.

Otherwise, if none of the previous 7 scenarios are satisfied, in scenario 8, the variable bS[xDi][yDj] is set equal to 0. After deriving the boundary filter strength, the number of samples to be filtered is derived, and the deblocking filter is applied to the samples. Note that when a block is coded in palette mode, the number of samples is set equal to 0. This means the deblocking filter is not applied to a block coded in palette mode.

As mentioned earlier, the construction of a current palette for a block contains two parts. First, the entry in the current palette may be predicted from a palette predictor. For each entry in the palette predictor, a reuse flag is signaled to indicate whether this entry is included in the current palette or not. Second, the component values of the current palette entry may be directly signaled. After the current palette is obtained, the palette predictor is updated using the current palette. FIG. 7 shows a portion of section 7.3.10.6 ("Palette coding syntax) of VVC draft 8. When parsing the syntax of a palette coded block, the reuse flags (i.e. "palette_predictor_run" 701 in FIG. 7) are first decoded followed by the component values of the new palette entries (i.e., "num_signalled_palette_entries" 702 and "new_palette_entries" 703 in FIG. 7). In the VVC draft 8, the number of palette predictor entries (i.e. "PredictorPaletteSize[startComp]" 704 in FIG. 7) need to be known before parsing the reuse flags. That means, when two neighboring blocks are both coded in palette modes, the syntax of the second block cannot be parsed until the palette predictor update process of the first block has been finished.

In the conventional palette predictor updating processes, however, it is required to check the reuse flag of each entry. In a worse scenario, up to 63 times of checks are needed. These conventional designs may not be hardware friendly for at least two reasons. First, the Context-based Adaptive Binary Arithmetic Coding (CABAC) parsing needs to wait until the palette predictor has been completely updated. Normally, the CABAC parsing is the slowest module in the hardware. This may reduce the CABAC throughput. Second, it may be burdensome on the hardware when the palette predictor updating process is implemented in the CABAC parsing stage.

Additionally, another issue in these conventional designs is that the boundary filter strength is not defined for palette mode. When one of neighboring blocks is coded in palette mode and the other neighboring block is coded in IBC or inter mode, the boundary filter strength is not defined.

Embodiments of the present disclosure provide implementations to combat the one or more issues described above. These embodiments may improve the palette predictor updating process, increasing the efficiency, speed, and resource consumption for systems implementing the palette prediction process—or similar processes—described above.

In some embodiments, the palette predictor updating process is simplified to reduce its complexity, thereby freeing up hardware resources. FIG. 8 shows a flow chart of a palette predictor updating process 800, according to embodiments of the present disclosure. Method 800 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 800. In some embodiments, method 800 can be implemented by a computer program product, embodied in a computer-readable medium, including computer-executable instructions, such as program code, executed by computers (e.g., apparatus 400 of FIG. 4). Referring to FIG. 8, method 800 may include the following steps 802-804.

In step 802, when updating a palette predictor, all palette entries of a current palette are added in front of a new palette predictor as a first set of entries. In step 804, all palette entries from a previous palette predictor are added to the end of the new palette predictor regardless of whether the entries are reused in the current palette or not as a second set of entries, and the second set of entries are after the first set of entries.

Figure 9:
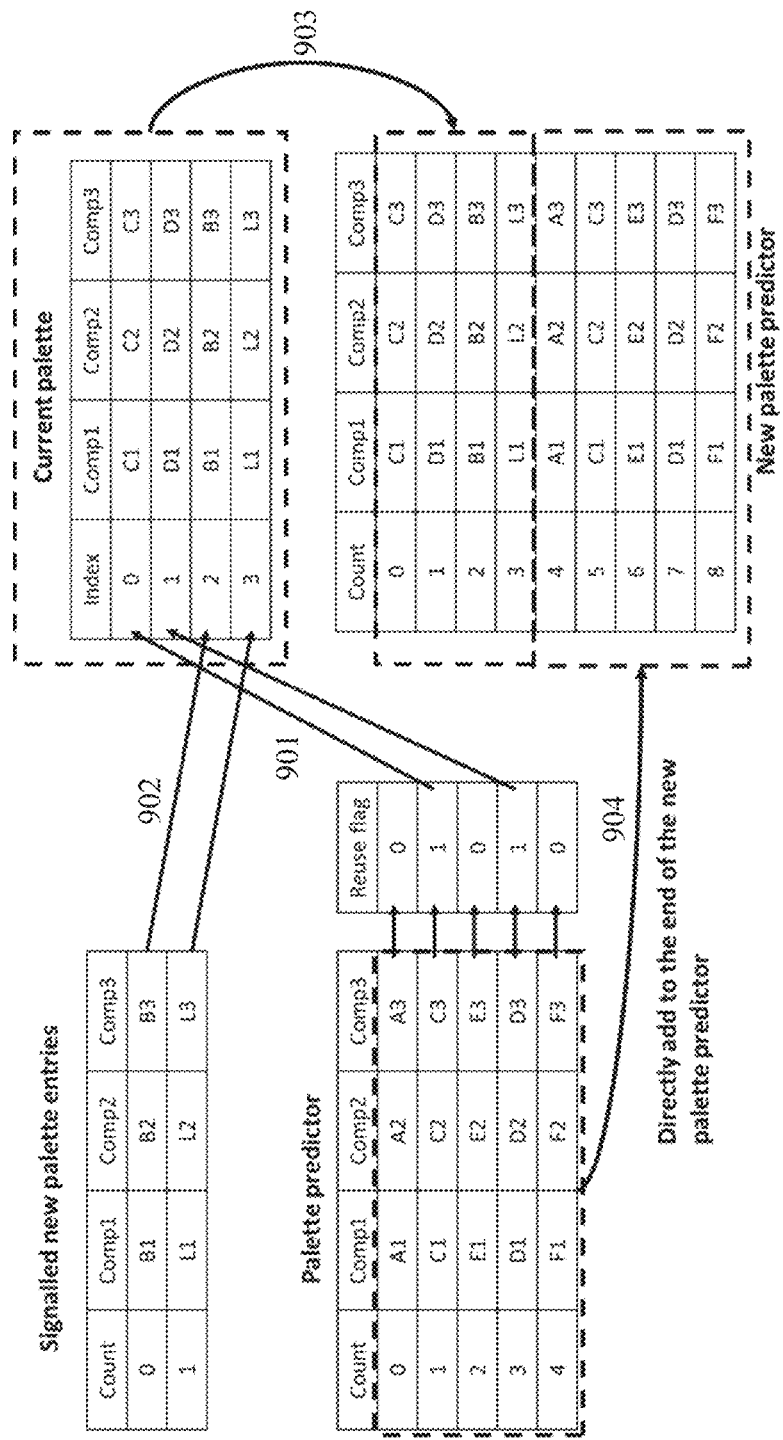
FIG. 9 shows an example of a palette predictor updating process, according to some embodiments of the present disclosure.

For example, FIG. 9 provides a simplified palette predictor updating process consistent with the process described in FIG. 8. A current palette is generated by process 901 and process 902. The current palette includes entries reused from previous palette predictor and the signaled new palette entries. In process 903, all the palette entries of the current palette as a first set of entries of a new palette predictor (corresponding to step 802). In process 904, palette entries from a previous palette predictor as a second set of entries of the new palette predictor regardless whether the entries are reused in the current palette or not (corresponding to step 804).

The benefit is that without checking the values of reuse flags, the size of new palette predictor is calculated by adding the size of current palette and the size of previous palette predictor. Since the updating process is much simpler than the conventional design in VVC draft 8 (such as shown in FIG. 10), the CABAC throughput may be increased.

For example, FIG. 11 shows an example decoding process for palette mode, consistent with embodiments of the present disclosure. Changes between the conventional design of FIG. 10 and the disclosed design of FIG. 11 include removed portions 1101 highlighted with struck text.

In some embodiments, although the palette predictor updating process is simplified, the palette predictor may have two or more identical entries (i.e. redundancy in the palette predictor) due to the lack of checking the reuse flags. While still an improvement, this may mean the prediction effectiveness of the palette predictor may be reduced.

Figure 12:
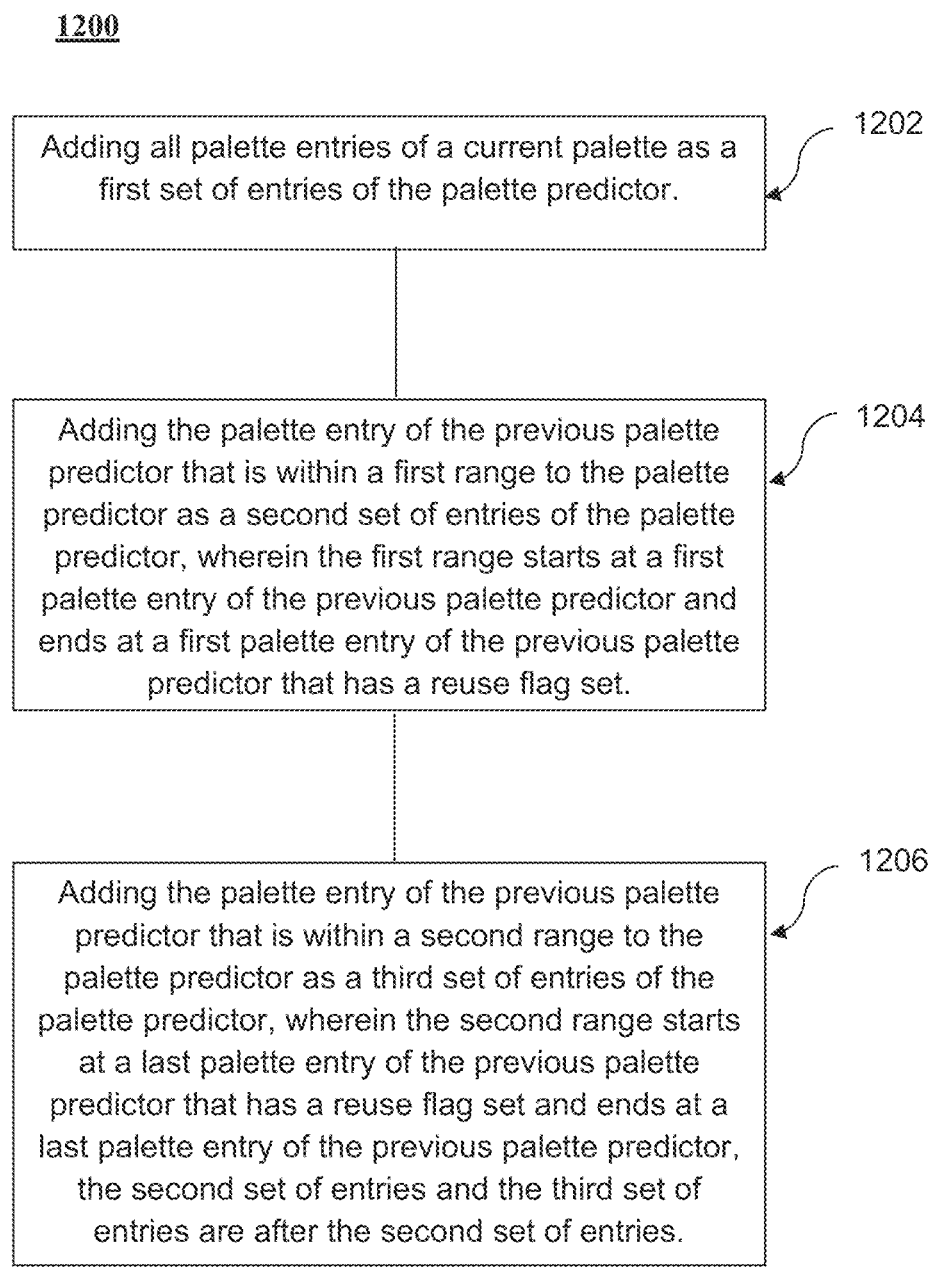
FIG. 12 shows a flow chart of another palette predictor updating process, according to some embodiments of the present disclosure.

FIG. 12 shows a flow chart of another palette predictor updating process 1200, according to embodiments of the present disclosure. Method 1200 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 may include the following steps 1202-1206.

In this exemplary embodiment, in order to remove the redundancy in the palette predictor and keep the palette predictor updating process simple, the previous palette predictor entries between the first reuse entry and the last reuse entry are directly discarded. Only the entries from the first entry to the first reuse entry and from the last reuse entry to the last entry of previous palette predictor is added to the new palette predictor. In summary, the palette predictor updating process is modified as follows: In step 1202 each entry of the current palette is added to the new palette predictor as a first set of entries. In step 1204, each entry from the first to the first reuse entry of the previous palette predictor is added to the new palette predictor as a second set of entries after the first set of entries. In step 1206, each entry from the last reuse entry to the last entry of the previous palette predictor is added to the new palette predictor as a third set of entries after the second set of entries.

Figure 13:
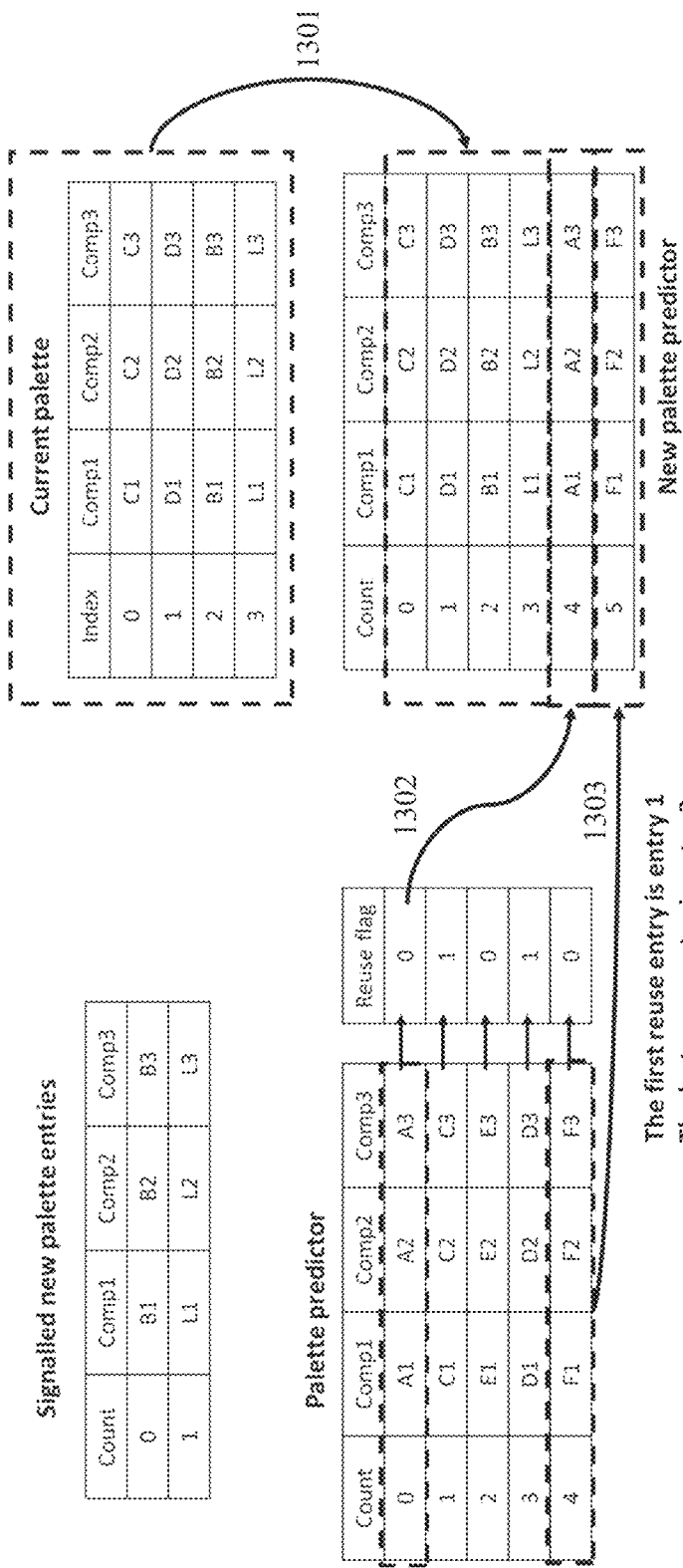
FIG. 13 shows an example of another palette predictor updating process, according to some embodiments of the present disclosure.

For example, FIG. 13 provides a simplified palette predictor updating process consistent with the process described in FIG. 12. In process 1301, all palette entries of the current palette are added to a palette predictor as a first set of entries of the new palette predictor (corresponding to step 1202). In process 1302, each entry from the first to the first reuse entry of the previous palette predictor is added to the new palette predictor as a second set of entries after the first set of entries (corresponding to step 1204). In process 1303, each entry from the last reuse entry to the last entry of the previous palette predictor is added to the new palette predictor as a third set of entries after the second set of entries (corresponding to step 1206). In some embodiments, the third set of entries is after the first set of entries, and the second set of entries is after the third set of entries.

Figure 14:
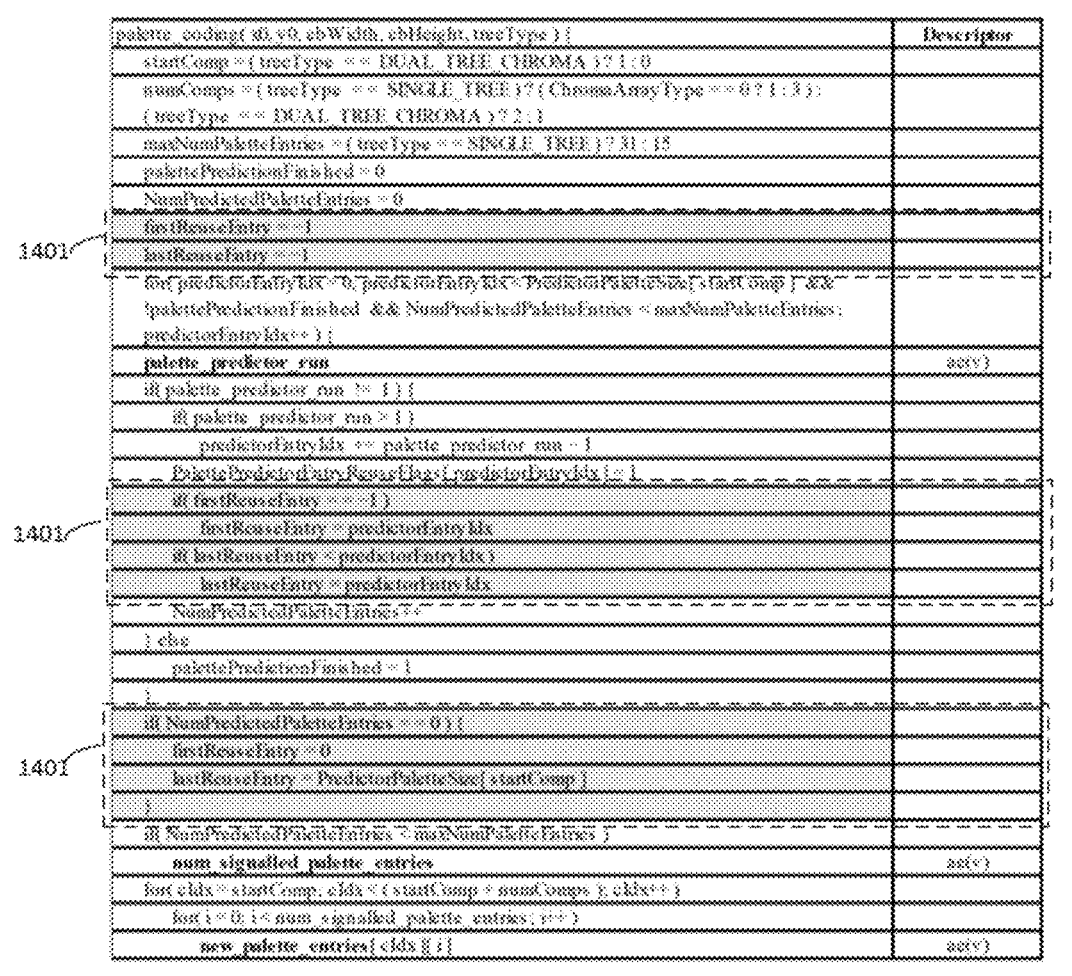
Figure 15:
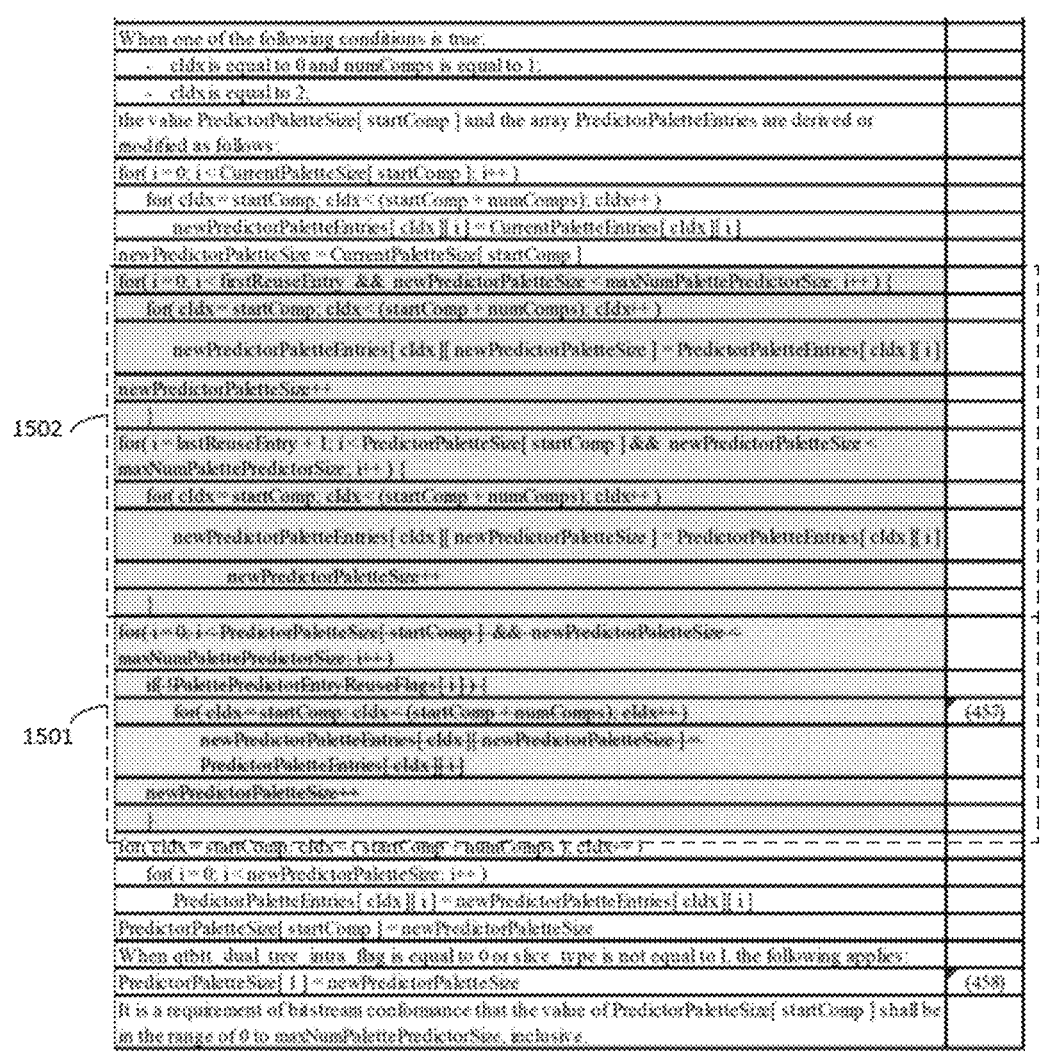

It is noted that the first reuse entry and the last entry can be derived when the reuse flags are parsed. There is no need to check the values of the reuse flags. The size of the new palette predictor is calculated by adding the size of the current palette, the size from 0 to the first reuse entry and the size from the last reuse entry to the last entry. FIG. 14 shows an example palette coding syntax, consistent with embodiments of the present disclosure. Changes between the conventional design of FIG. 7 and the disclosed design of FIG. 14 include added portions 1401 marked. FIG. 15 shows an example decoding process for palette mode, consistent with embodiments of the present disclosure. Changes between the conventional design of FIG. 10 and the disclosed design of FIG. 15 include removed portions 1501 highlighted with stuck text and an added portion 1502 marked.

In the previously disclosed embodiments, although the palette predictor updating process is simplified, this process is needed to implement in the CABAC parsing stage in the hardware design. In some embodiment, the number of reuse flags is set to a fixed value. Therefore, the CABAC can keep parsing without waiting for the palette predictor updating process. Furthermore, the palette predictor updating process can be implemented in a different pipeline stage outside of CABAC parsing stage, which allows more flexibility for the hardware design.

Figure 16:
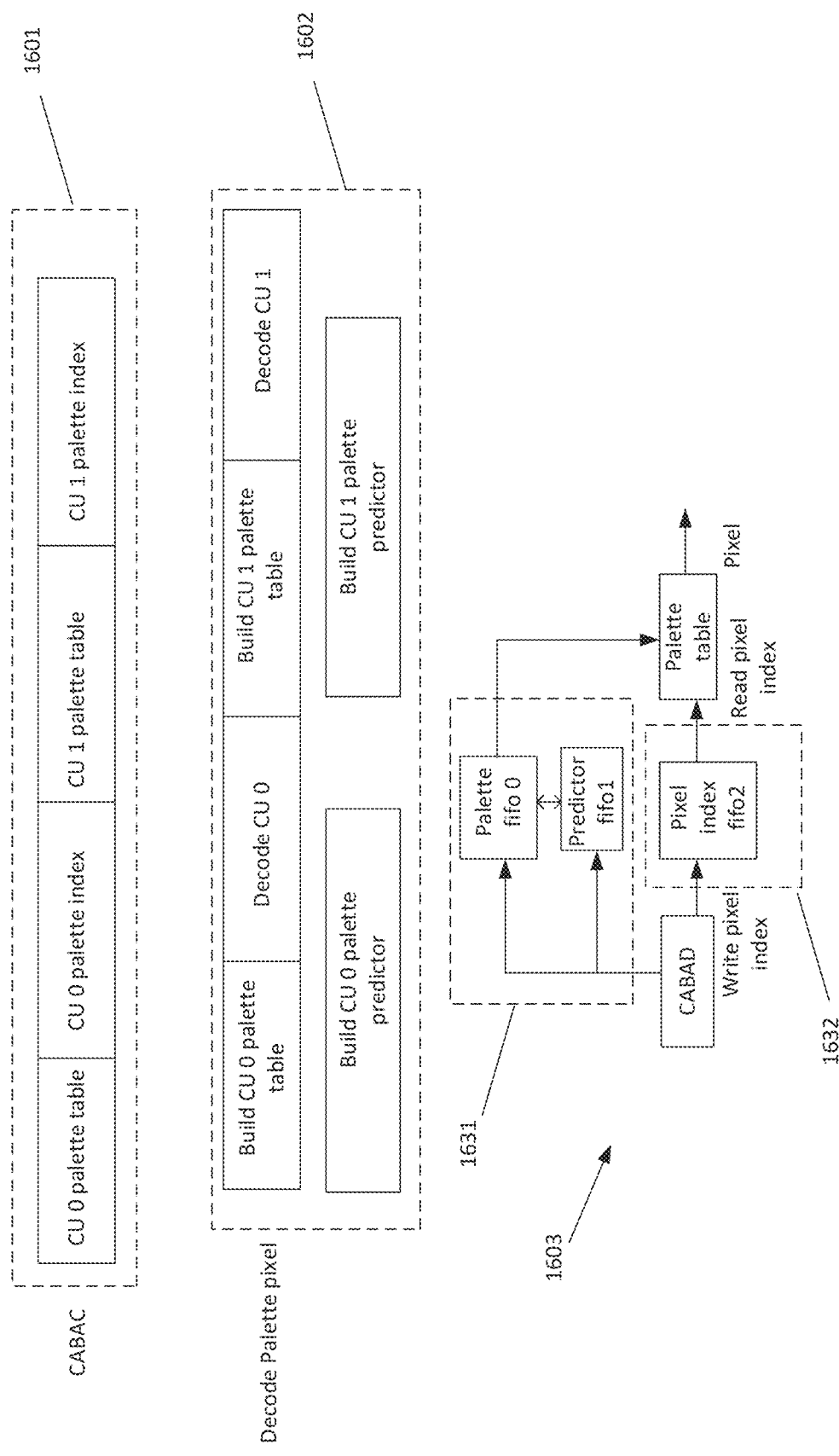
FIG. 16 shows an illustration of a decoder hardware design for palette mode implementing a portion of a palette predictor updating process, according to some embodiments of the present disclosure.

FIG. 16 shows an illustration of decoder hardware design for the palette mode. A data structure 1601 and a data structure 1602 are exemplarily illustrated for CABAC and decoding palette pixel. A decoder hardware design 1603 includes a predictor updating module 1631 and a CABAC parsing module 1632, where the predictor updating process and the CABAC parsing process are in parallel. Therefore, the CABAC can keep parsing without waiting for the palette updating process.

To set the number of reuse flags to a fixed value for each coding block, in some embodiments, the size of the palette predictor is initialized to a pre-defined value at the beginning of each slice for non-wavefront case and at the beginning of each CTU row for wavefront case. The pre-defined value is set to the maximum size of the palette predictor. In one example, the number of reuse flags is 31 or 63 depending on the slice type and the dual tree mode setting. When the slice type is I-slice and the dual tree mode is on (referred to as case 1), the number of reuse flags is set to 31. Otherwise (the slice type is B-/P-slice or the slice type is 1-slice and the dual tree mode is off, (referred to as case 2), the number of reuse flags is set to 63. Other numbers of reuse flags of the two cases may be used, and it may be beneficial to maintain a factor of 2 relationship between the number of reuse flags for case 1 and the number of reuse flags for case 2. Besides, when initializing the palette predictor, the value of each entry and each component is set to 0 or (1<<(sequence bit depth-1)).

Figure 17:
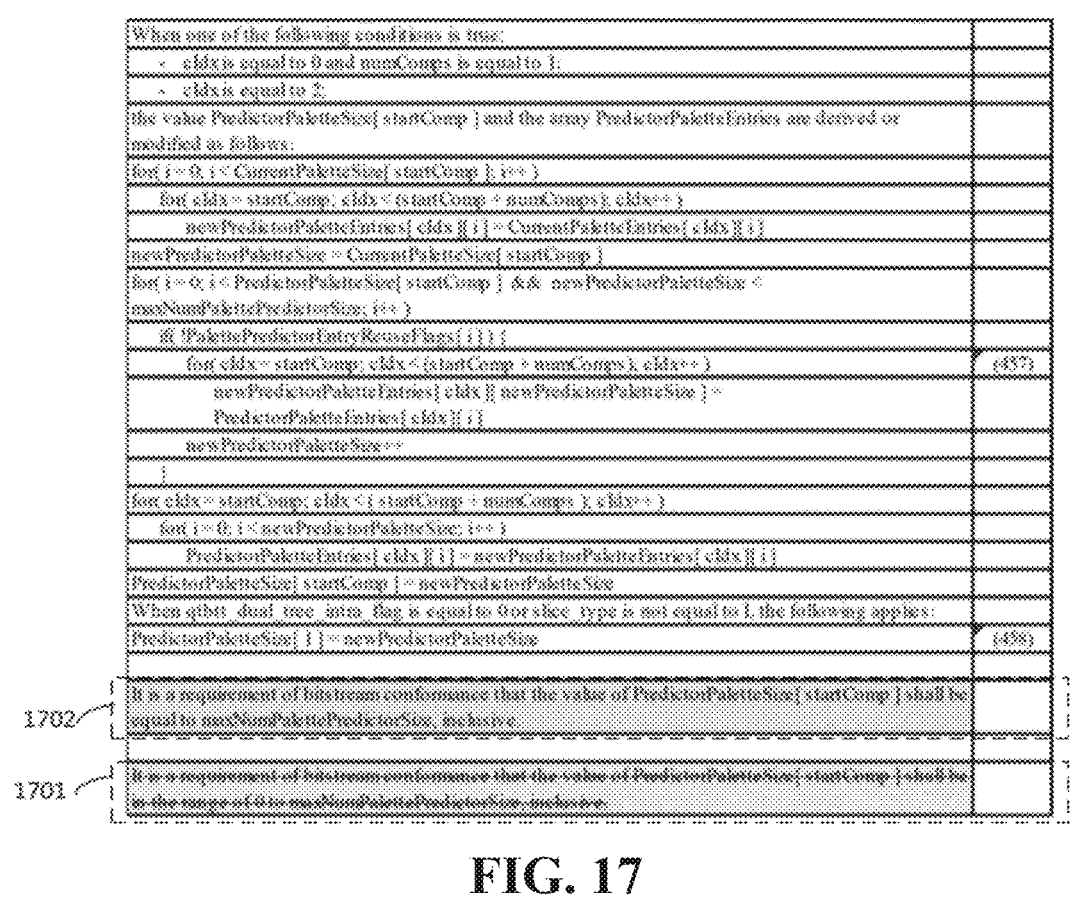

For example, FIG. 17 shows an example decoding process for palette mode, consistent with embodiments of the present disclosure. Changes between the conventional design of FIG. 10 and the disclosed design of FIG. 17 include a removed portion 1701 highlighted with struck text and an added portion 1702 marked. Similarly, FIG. 19 shows an example initialization process, consistent with embodiments of the present disclosure. Changes between the conventional design of FIG. 18 and the disclosed design of FIG. 19 include a removed portion 1901 highlighted with struck text and an added portion 1902 marked.

Figure 20:
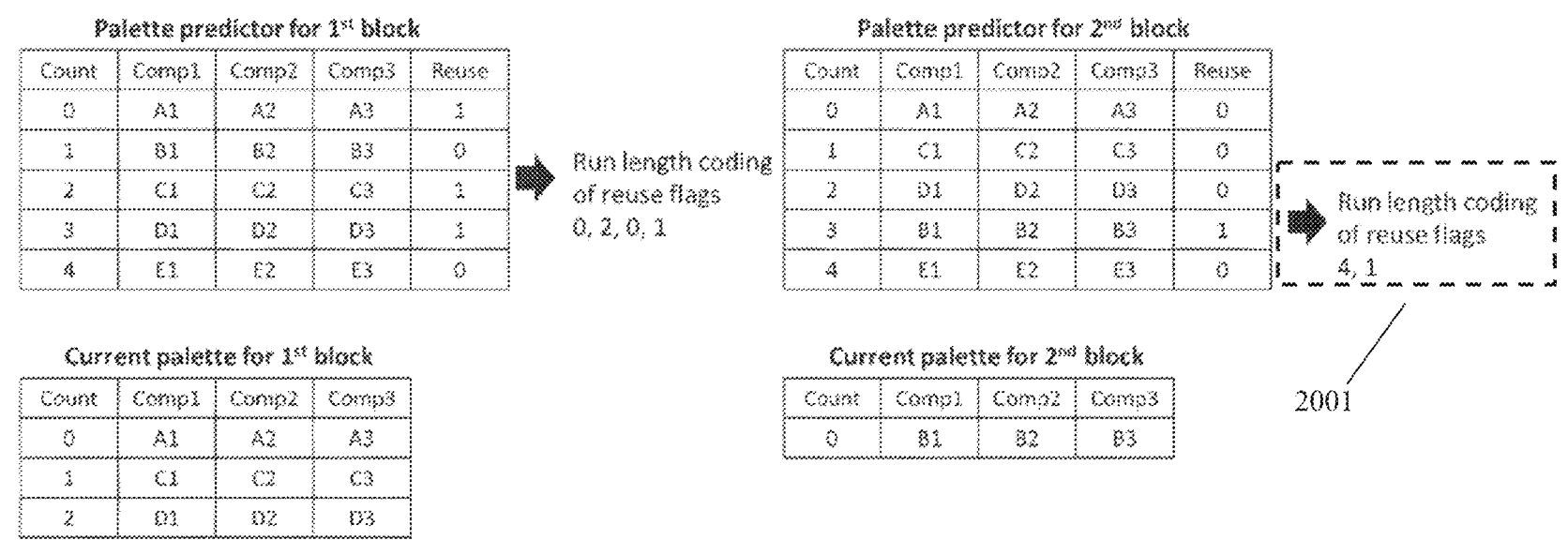
Figure 22:
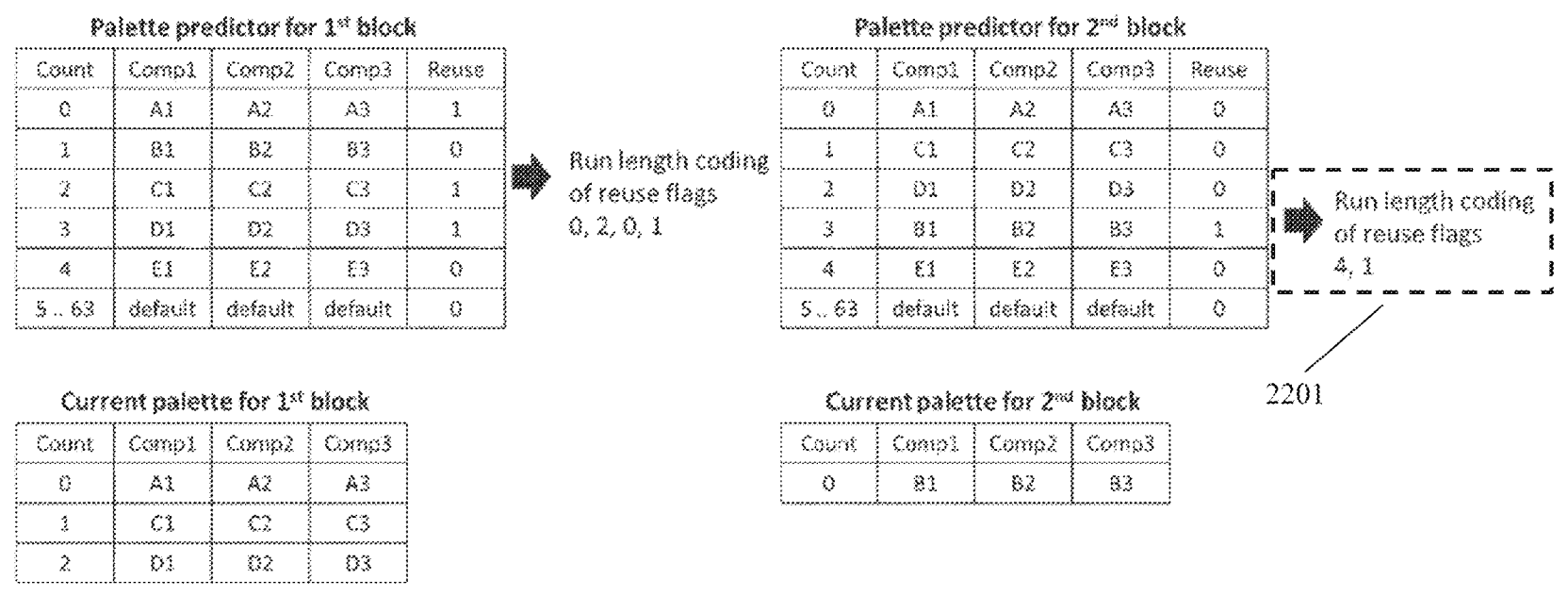

In some embodiments, where reuse flag is set to a fixed value or where the embodiments FIG. 9 are implemented, some redundancy may be introduced into the palette predictor. In some embodiments, this may not be a problem since those redundant entries are never selected for prediction at the encoder side. Examples of the palette predictor update are shown in FIGS. 20, 21, and 22. FIG. 20 shows an example according to the procedure specified in VVC draft 8, FIG. 21 shows an example according to some implementations of the method proposed in FIG. 9 (referred to as a first embodiment), and FIG. 22 shows another example according to some implementations of the embodiments where with the reuse flag is set to a fixed value (referred to as third embodiment). As a comparison of FIGS. 20, 21, and 22 shows, assuming that there is no new signaled palette entry, the method proposed in the first embodiment (FIG. 21) may increase the number of bits for signaling reuse flags 2101, whereas the method proposed in the third embodiment (FIG. 22) keeps the same number of bits for signaling reuse flags 2201 as the number of bits for signaling reuse flags 2001 of the method in the VVC draft 8 design (FIG. 20).

In some embodiments, the palette predictor is first initialized to a fixed value. That means that there may be redundant entries in the palette predictor. Although redundant entries may not be problematic, as previously discussed, the design in this embodiment does not prevent an encoder from using those redundant entries. If it so happens that an encoder selects one of these redundant entries, the coding performance of the palette predictor, and therefore of palette mode, may be decreased. To prevent this case, in some embodiments, a bitstream conformance is added when signaling the reuse flags. In some embodiments, the bitstream conformance has a value of a size of the palette predictor size is equal to a maximum size of the palette predictor when signaling the reuse flags. More specifically, a range constraint is added to the binarization value of the reuse flags.

Figure 23:
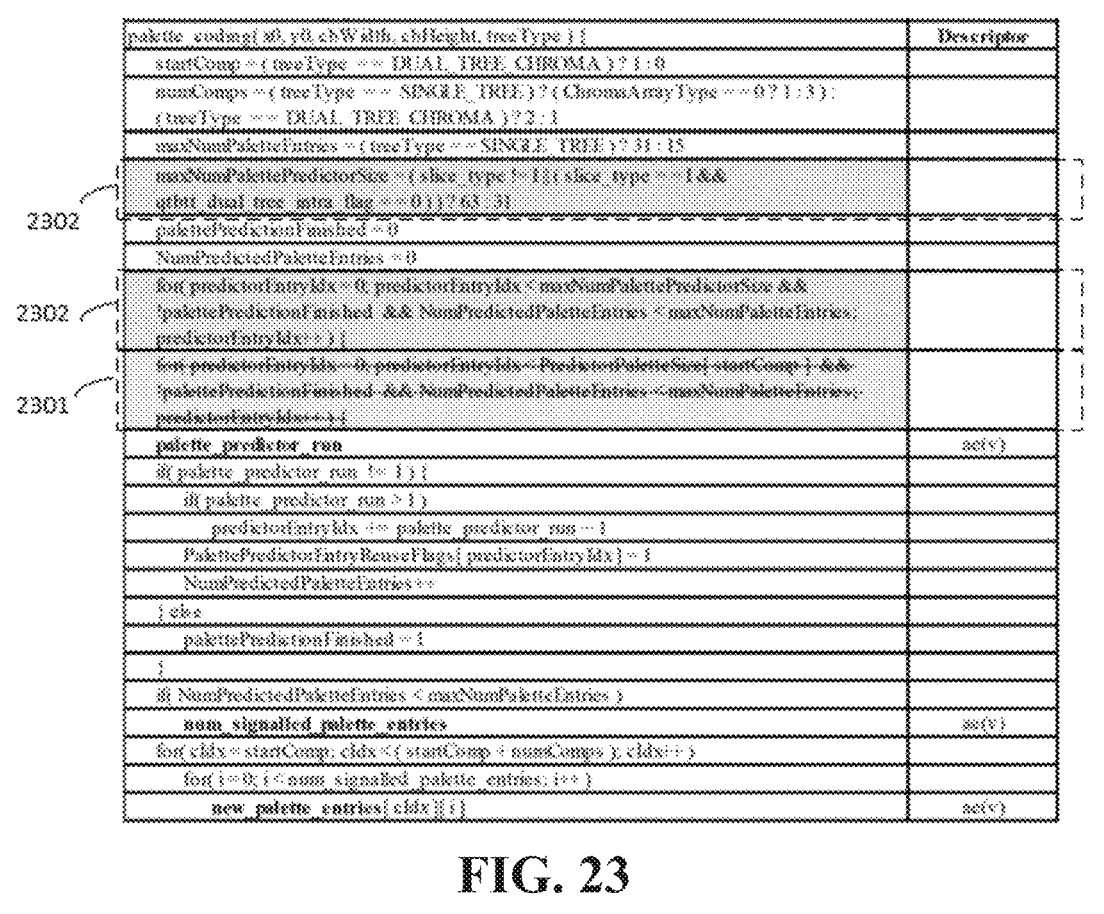
Figure 25:
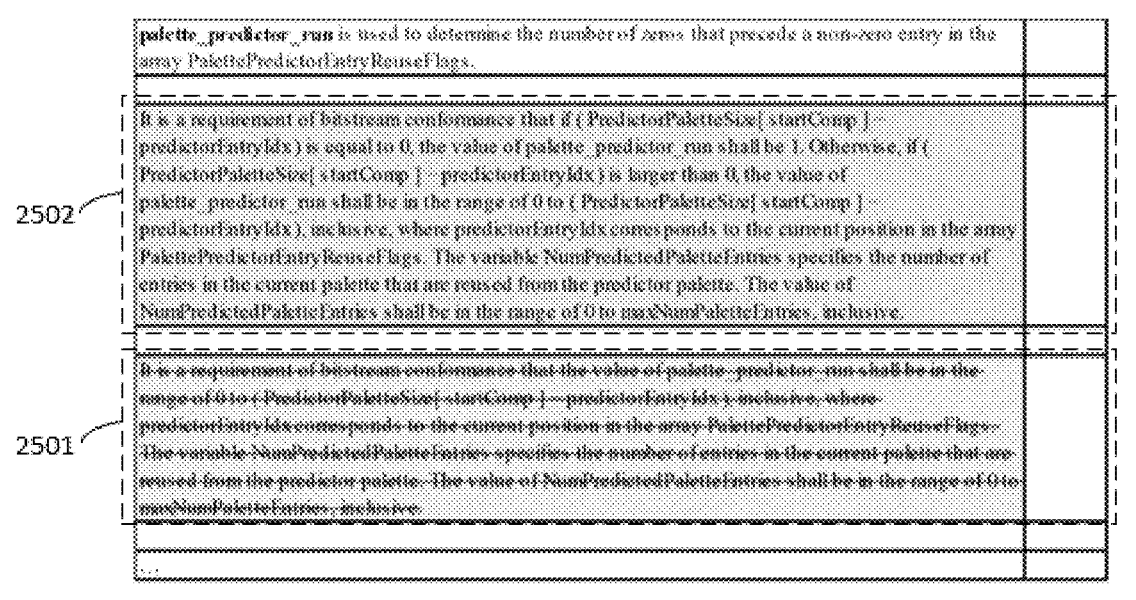

For example, FIG. 23 shows an example palette coding syntax, consistent with embodiments of the present disclosure. Changes between the conventional design of FIG. 7 and the disclosed design of FIG. 23 includes a removed portion 2301 highlighted with struck text and an added portion 2302 marked. Similarly, FIG. 25 shows an example palette coding semantics, consistent with embodiments of the present disclosure. Changes between the conventional design of FIG. 24 and the disclosed design of FIG. 25 include a removed portion 2501 highlighted with struck text and an added portion 2502 marked.

Moreover, the present disclosure provides the following methods to address the issue of the deblocking filter of palette mode.

In some embodiments, palette mode is treated as a subset of intra prediction mode. Therefore, if one of the neighboring blocks is coded in palette mode, the boundary filter strength is set equal to 2. More specifically, the portion of the VVC draft 8 specification detailing the process of calculating the boundary filtering strength is altered so that scenario 3 now states: "if the sample p0 or q0 is in the coding block of a coding unit coded with intra prediction mode or palette mode, bS[xDi][yDj] is set equal to 2." The added language is underlined.

In some embodiments, palette mode is treated as an independent coding mode. When the coding modes of two neighboring blocks are different, the boundary filter strength is set equal to 1. More specifically, the portion of the VVC draft 8 specification detailing the process of calculating the boundary filtering strength is altered so that scenario 6 now states: "the prediction mode of the coding subblock containing the sample p0 is different from the prediction mode of the coding subblock containing the sample q0, bS[xDi][yDj] is set equal to 1." The remove language is struck.

In some embodiments, palette mode is treated as an independent coding mode. Similar to the BDPCM mode setting, when one of the coding blocks is palette mode, the boundary filter strength is set equal to 0. More specifically, the portion of the VVC draft 8 specification detailing the process of calculating the boundary filtering strength is altered so that a new scenario is inserted between scenario 3 and scenario 4 which states: "otherwise, if the block edge is also a coding block edge and the sample p0 or q0 is in a coding block with pred_mode_plt_flag equal to 1, bS[xDi][yDj] is set equal to 0." Using this modified process, there would be 9 scenarios, with scenarios 4-8 being renumbered to be scenarios 5-9. Of note is that a block coded in palette mode is equivalent to the pred_mode_plt_flag being equal to 1.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

The embodiments may further be described using the following clauses:

1. A video data processing method, comprising:
    processing one or more coding units using one or more palette predictors, wherein a palette predictor of the one or more palette predictors is updated by:
        adding all palette entries of a current palette as a first set of entries of the palette predictor; and
        adding palette entries from a previous palette predictor as a second set of entries of the palette predictor regardless of a value of reuse flag of a palette entry in the previous palette predictor, wherein the second set of entries are after the first set of entries.
2. The method of clause 1, wherein each palette entry of the first set of entries and the second set of entries of the palette predictor includes a reuse flag.
3. The method of clause 1, further comprises:
    receiving a video frame for processing, and
    generating the one or more coding units for the video frame.
4. The method of anyone of clauses 1 to 3, wherein each palette entry of the palette predictor has a corresponding reuse flag, and wherein a number of reuse flags for the palette predictor is set to a fixed number for a corresponding coding unit.
5. A video data processing method, comprising:
    processing one or more coding units using one or more palette predictors, wherein a palette predictor of the one or more palette predictors is updated by:
        adding all palette entries of a current palette as a first set of entries of the palette predictor;
        adding one or more palette entries of a previous palette predictor that is within a first range to the palette predictor as a second set of one or more entries of the palette predictor, wherein the first range starts at a first palette entry of the previous palette predictor and ends at a first palette entry of the previous palette predictor that has a reuse flag set, and
        adding one or more palette entries of the previous palette predictor that is within a second range to the palette predictor as a third set of one or more entries of the palette predictor, wherein the second range starts at a last palette entry of the previous palette predictor that has a reuse flag set and ends at a last palette entry of the previous palette predictor, the second set of entries and the third set of entries are after the first set of entries.
6. The method of clause 5, wherein each palette entry of the first set of entries, the second set of entries and the third set of entries of the palette predictor includes a reuse flag.
7. The method of clause 5, further comprises:
    receiving a video frame for processing, and
    generating the one or more coding units for the video frame.
8. The method of any one of clauses 5 to 7, wherein each palette entry of the one or more palette predictors has a corresponding reuse flag, and
    wherein a number of reuse flags for each palette predictor is set to a fixed number for a corresponding coding unit.
9. A video data processing method, comprising:
    receiving a video frame for processing,
    generating one or more coding units of the video frame; and
    processing one or more coding units using one or more palette predictors having palette entries,
        wherein each palette entry of the one or more palette predictors has a corresponding reuse flag, and wherein a number of reuse flags for each palette predictor is set to a fixed number for a corresponding coding unit.
10. The method of clause 9, wherein the palette predictor is updated by:
adding all palette entries of a current palette as a first set of entries of the palette predictor; and
adding entries from the previous palette predictor that are not reused in the current palette as a second set of entries of the palette predictor, wherein the second set of entries are after the first set of entries.
11. The method of clause 9, wherein the fixed number is set based on a slice type and a dual tree mode setting.
12. The method of clause 9, wherein a size of a palette predictor of the one or more palette predictors is initialized to a pre-defined value at a beginning of a slice for non-wavefront case.
13. The method of clause 9, wherein a size of a palette predictor of the one or more palette predictors is initialized to a pre-defined value at a beginning of a coding unit row for wave front case.
14. The method of clause 12 or 13, further comprises adding a bitstream conformance having a value of a size of the palette predictor to be equal to a maximum size of the palette predictor when signaling the reuse flags.
15. The method of any one of clauses 12 to 14, wherein when initializing the one or more palette predictors, a value of each entry and each component is set to 0 or (1<<(sequence bit depth-1)).
16. The method of any one of clauses 9 to 15, further comprises adding a range constraint to a binarization value of the reuse flags.
17. An apparatus for performing video data processing, the apparatus comprising:
a memory figured to store instructions; and
a processor coupled to the memory and configured to execute the instructions to cause the apparatus to perform:
processing one or more coding units using one or more palette predictors, wherein a palette predictor of the one or more palette predictors is updated by
adding all palette entries of a current palette as a first set of entries of the palette predictor; and
adding palette entries from a previous palette predictor as a second set of entries of the palette predictor regardless of a value of reuse flag of a palette entry in the previous palette predictor, wherein the second set of entries are after the first set of entries.
18. The apparatus of clause 17, wherein each palette entry of the first set of entries and the second set of entries of the palette predictor includes a reuse flag.
19. The apparatus of clause 17, wherein the processor is further configured to execute the instructions to cause the apparatus to perform:
receiving a video frame for processing, and
generating the one or more coding units for the video frame.
20. The apparatus of any one of clauses 17 to 19, wherein each palette entry of the palette predictor has a corresponding reuse flag, and
wherein a number of reuse flags for the palette predictor is set to a fixed number for a corresponding coding unit.

21. An apparatus for performing video data processing, the apparatus comprising:
a memory figured to store instructions; and
a processor coupled to the memory and configured to execute the instructions to cause the apparatus to perform:
processing one or more coding units using one or more palette predictors, wherein a palette predictor of the one or more palette predictors is updated by
adding all palette entries of a current palette as a first set of entries of the palette predictor;
adding one or more palette entries of a previous palette predictor that is within a first range to the palette predictor as a second set of one or more entries of the palette predictor, wherein the first range starts at a first palette entry of the previous palette predictor and ends at a first palette entry of the previous palette predictor that has a reuse flag set, and
adding one or more palette entries of the previous palette predictor that is within a second range to the palette predictor as a third set of one or more entries of the palette predictor, wherein the second range starts at a last palette entry of the previous palette predictor that has a reuse flag set and ends at a last palette entry of the previous palette predictor, the second set of entries and the third set of entries are after the first set of entries.
22. The apparatus of clause 21, wherein each palette entry of the first set of entries and the second set of entries of the palette predictor includes a reuse flag.
23. The apparatus of clause 21, wherein the processor is further configured to execute the instructions to cause the apparatus to perform:
receiving a video frame for processing, and
generating the one or more coding units for the video frame.
24. The apparatus of any one of clauses 21 to 23, wherein each palette entry of the palette predictor has a corresponding reuse flag, and
wherein a number of reuse flags for the palette predictor is set to a fixed number for a corresponding coding unit.
25. An apparatus for performing video data processing, the apparatus comprising:
a memory figured to store instructions; and
a processor coupled to the memory and configured to execute the instructions to cause the apparatus to perform:
receiving a video frame for processing;
generating one or more coding units of the video frame; and
processing one or more coding units using one or more palette predictors having palette entries,
wherein each palette entry of the one or more palette predictors has a corresponding reuse flag, and
wherein a number of reuse flags for each palette predictor is set to a fixed number for a corresponding coding unit.
26. The apparatus of clause 25, wherein the processor is further configured to execute the instructions to cause the apparatus to perform:
updating the palette predictor by:

adding all palette entries of a current palette as a first set of entries of the palette predictor; and adding entries from the previous palette predictor that are not reused in the current palette as a second set of entries of the palette predictor, wherein the second set of entries are after the first set of entries.

27. The apparatus of clause 25, wherein the fixed number is set based on a slice type and a dual tree mode setting.

28. The apparatus of clause 25, wherein a size of a palette predictor of the one or more palette predictors is initialized to a pre-defined value at a beginning of a slice for non-wavefront case.

29. The apparatus of clause 25, wherein a size of a palette predictor of the one or more palette predictors is initialized to a pre-defined value at a beginning of a coding unit row for wave front case.

30. The apparatus of clause 28 or 29, wherein the processor is further configured to execute the instructions to cause the apparatus to perform adding a bitstream conformance having a value of a size of the palette predictor to be equal to a maximum size of the palette predictor when signaling the reuse flags.

31. The apparatus of any one of clauses 28 to 30, wherein when initializing the one or more palette predictors, a value of each entry and each component is set to 0 or (1<<(sequence bit depth-1)).

32. The apparatus of any one of clauses 25 to 31, wherein the processor is further configured to execute the instructions to cause the apparatus to perform adding a range constraint to a binarization value of the reuse flags.

33. A non-transitory computer readable medium that stores a set of instructions that is executable by one or more processors of an apparatus to cause the apparatus to initiate a method for performing video data processing, the method comprising:
processing one or more coding units using one or more palette predictors, wherein a palette predictor of the one or more palette predictors is updated by:
adding all palette entries of a current palette as a first set of entries of the palette predictor; and
adding palette entries from a previous palette predictor as a second set of entries of the palette predictor regardless of a value of reuse flag of a palette entry in the previous palette predictor, wherein the second set of entries are after the first set of entries.

34. The non-transitory computer readable medium of clause 33, wherein each palette entry of the first set of entries and the second set of entries of the palette predictor includes a reuse flag.

35. The non-transitory computer readable medium of clause 33, wherein the method further comprises:
receiving a video frame for processing, and
generating the one or more coding units for the video frame.

36. The non-transitory computer readable medium of anyone of clauses 33 to 35, wherein each palette entry of the palette predictor has a corresponding reuse flag, and wherein a number of reuse flags for the palette predictor is set to a fixed number for a corresponding coding unit.

37. A non-transitory computer readable medium that stores a set of instructions that is executable by one or more processors of an apparatus to cause the apparatus to initiate a method for performing video data processing, the method comprising:
processing one or more coding units using one or more palette predictors, wherein a palette predictor of the one or more palette predictors is updated by:
adding all palette entries of a current palette as a first set of entries of the palette predictor;
adding one or more palette entries of a previous palette predictor that is within a first range to the palette predictor as a second set of one or more entries of the palette predictor, wherein the first range starts at a first palette entry of the previous palette predictor and ends at a first palette entry of the previous palette predictor that has a reuse flag set, and
adding one or more palette entries of the previous palette predictor that is within a second range to the palette predictor as a third set of one or more entries of the palette predictor, wherein the second range starts at a last palette entry of the previous palette predictor that has a reuse flag set and ends at a last palette entry of the previous palette predictor, the second set of entries and the third set of entries are after the first set of entries.

38. The non-transitory computer readable medium of clause 37, wherein each pallet entry of the first set of entries and the second set of entries of the palette predictor includes a reuse flag.

39. The non-transitory computer readable medium of clause 37, wherein the method further comprises:
receiving a video frame for processing, and
generating the one or more coding units for the video frame.

40. The non-transitory computer readable medium of anyone of clauses 37 to 39, wherein each palette entry of the palette predictor has a corresponding reuse flag, and
wherein a number of reuse flags for the palette predictor is set to a fixed number for a corresponding coding unit.

41. A non-transitory computer readable medium that stores a set of instructions that is executable by one or more processors of an apparatus to cause the apparatus to initiate a method for performing video data processing, the method comprising:
receiving a video frame for processing;
generating one or more coding units of the video frame; and
processing one or more coding units using one or more palette predictors having palette entries,
wherein each palette entry of the one or more palette predictors has a corresponding reuse flag, and
wherein a number of reuse flags for each palette predictor is set to a fixed number for a corresponding coding unit.

42. The non-transitory computer readable medium of clause 41, wherein the palette predictor is updated by:
adding all palette entries of a current palette as a first set of entries of the palette predictor; and
adding entries from the previous palette predictor that are not reused in the current palette as a second set of entries of the palette predictor, wherein the second set of entries are after the first set of entries.

43. The non-transitory computer readable medium of clause 41, wherein the fixed number is set based on a slice type and a dual tree mode setting.

44. The non-transitory computer readable medium of clause 41, wherein a size of a palette predictor of the one or more palette predictors is initialized to a predefined value at a beginning of a slice for non-wavefront case.

45. The non-transitory computer readable medium of clause 41, wherein a size of a palette predictor of the one or more palette predictors is initialized to a predefined value at a beginning of a coding unit row for wave front case.

46. The non-transitory computer readable medium of clause 44 or 45, further comprises adding a bitstream conformance having a value of a size of the palette predictor to be equal to a maximum size of the palette predictor when signaling the reuse flags.

47. The non-transitory computer readable medium of any one of clauses 44 to 46, wherein when initializing the one or more palette predictors, a value of each entry and each component is set to 0 or (1<<(sequence bit depth-1)).

48. The non-transitory computer readable medium of any one of clauses 41 to 47, further comprises adding a range constraint to a binarization value of the reuse flags.

49. A method for deblocking filter of palette mode, comprising:
receiving a video frame for processing;
generating the one or more coding units for the video frame, wherein each coding unit of the one or more coding units has one or more coding blocks; and
setting a boundary filter strength to 2 in response to at least a first coding block of two neighboring coding blocks being coded in palette mode.

50. A method for deblocking filter of palette mode, comprising:
receiving a video frame for processing;
generating the one or more coding units for the video frame, wherein each coding unit of the one or more coding units has one or more coding blocks; and
setting a boundary filter strength to 1 in response to at least a first coding block of two neighboring coding blocks being coded in palette mode and second coding block of the two neighboring coding blocks has a coding mode different from the palette mode.

51. An apparatus for performing video data processing, the apparatus comprising:
a memory figured to store instructions; and
a processor coupled to the memory and configured to execute the instructions to cause the apparatus to perform:
receiving a video frame for processing;
generating the one or more coding units for the video frame, wherein each coding unit of the one or more coding units has one or more coding blocks; and
setting a boundary filter strength to 1 in response to at least a first coding block of two neighboring coding blocks being coded in palette mode and second coding block of the two neighboring coding blocks has a coding mode different from the palette mode.

52. A non-transitory computer readable medium that stores a set of instructions that is executable by one or more processors of an apparatus to cause the apparatus to initiate a method for performing video data processing, the method comprising:
receiving a video frame for processing;
generating the one or more coding units for the video frame, wherein each coding unit of the one or more coding units has one or more coding blocks; and
setting a boundary filter strength to 1 in response to at least a first coding block of two neighboring coding blocks being coded in palette mode and second coding block of the two neighboring coding blocks has a coding mode different from the palette mode.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video data processing method, comprising:
receiving a video frame for processing;
generating one or more coding units of the video frame; and
processing the one or more coding units using one or more palette predictors having palette entries,
wherein each palette entry of the one or more palette predictors has a corresponding reuse flag, and
wherein a number of reuse flags for each palette predictor is set to a fixed number for a corresponding coding unit, wherein the fixed number of reuse flags is set to 31 or 63 based on a slice type and a dual tree mode setting.

2. The method of claim 1, wherein the palette predictor is updated by:
adding all palette entries of a current palette as a first set of entries of the palette predictor; and
adding entries from the previous palette predictor that are not reused in the current palette as a second set of entries of the palette predictor, wherein the second set of entries are after the first set of entries.

3. The method of claim 1, wherein the palette predictor is updated by:
adding all palette entries of a current palette as a first set of entries of the palette predictor; and
adding palette entries from a previous palette predictor as a second set of entries of the palette predictor regardless of a value of reuse flag of a palette entry in the previous palette predictor, wherein the second set of entries are after the first set of entries.

4. The method of claim 1, wherein the palette predictor is updated by:
adding all palette entries of a current palette as a first set of entries of the palette predictor;
adding one or more palette entries of a previous palette predictor that is within a first range to the palette predictor as a second set of one or more entries of the palette predictor, wherein the first range starts at a first palette entry of the previous palette predictor and ends at a first palette entry of the previous palette predictor that has a reuse flag set, and adding one or more palette entries of the previous palette predictor that is within a second range to the palette predictor as a third set of one or more entries of the palette predictor, wherein the second range starts at a last palette entry of the previous palette predictor that has a reuse flag set and ends at a last palette entry of the previous palette predictor, the second set of entries and the third set of entries are after the first set of entries.

5. The method of claim 1, wherein the fixed number being set to 31 or 63 based on the slice type and the dual tree mode setting further comprises: setting the fixed number to be 31 when the slice type is I-slice and the dual tree mode is on; or setting the fixed number to be 63 when the slice type is B-/P-slice or the slice type is I-slice and the dual tree mode is off.

6. The method of claim 1, wherein a size of a palette predictor of the one or more palette predictors is initialized to a pre-defined value at a beginning of a slice for non-wavefront case.

7. An apparatus for performing video data processing, the apparatus comprising:
a memory figured to store instructions; and
one or more processors configured to execute the instructions to cause the apparatus to perform:
receiving a video frame for processing;
generating one or more coding units of the video frame; and
processing the one or more coding units using one or more palette predictors having palette entries,
wherein each palette entry of the one or more palette predictors has a corresponding reuse flag, and
wherein a number of reuse flags for each palette predictor is set to a fixed number for a corresponding coding unit, wherein the fixed number of reuse flags is set to 31 or 63 based on a slice type and a dual tree mode setting.

8. The apparatus of claim 7, wherein the one or more processors are further configured to execute the instructions to cause the apparatus to perform:
updating the palette predictor by:
adding all palette entries of a current palette as a first set of entries of the palette predictor; and
adding entries from the previous palette predictor that are not reused in the current palette as a second set of entries of the palette predictor, wherein the second set of entries are after the first set of entries.

9. The apparatus of claim 7, wherein the one or more processors are further configured to execute the instructions to cause the apparatus to perform:
updating the palette predictor by:
adding all palette entries of a current palette as a first set of entries of the palette predictor; and
adding palette entries from a previous palette predictor as a second set of entries of the palette predictor regardless of a value of reuse flag of a palette entry in the previous palette predictor, wherein the second set of entries are after the first set of entries.

10. The apparatus of claim 7, wherein the one or more processors are further configured to execute the instructions to cause the apparatus to perform:
updating the palette predictor by:
adding all palette entries of a current palette as a first set of entries of the palette predictor;

adding one or more palette entries of a previous palette predictor that is within a first range to the palette predictor as a second set of one or more entries of the palette predictor, wherein the first range starts at a first palette entry of the previous palette predictor and ends at a first palette entry of the previous palette predictor that has a reuse flag set, and adding one or more palette entries of the previous palette predictor that is within a second range to the palette predictor as a third set of one or more entries of the palette predictor, wherein the second range starts at a last palette entry of the previous palette predictor that has a reuse flag set and ends at a last palette entry of the previous palette predictor, the second set of entries and the third set of entries are after the first set of entries.

11. The apparatus of claim 7, wherein the fixed number being set to 31 or 63 based on the slice type and the dual tree mode setting further comprises:
setting the fixed number to be 31 when the slice type is I-slice and the dual tree mode is on; or setting the fixed number to be 63 when the slice type is B-/P-slice or the slice type is I-slice and the dual tree mode is off.

12. The apparatus of claim 7, wherein a size of a palette predictor of the one or more palette predictors is initialized to a pre-defined value at a beginning of a slice for non-wavefront case.

13. A non-transitory computer readable medium storing a bitstream of a video for processing according to a method comprising:
generating one or more coding units of a video frame; and
processing the one or more coding units using one or more palette predictors having palette entries,
wherein each palette entry of the one or more palette predictors has a corresponding reuse flag, and
wherein a number of reuse flags for each palette predictor is set to a fixed number for a corresponding coding unit, wherein the fixed number of reuse flags is set to 31 or 63 based on a slice type and a dual tree mode setting.

14. The non-transitory computer readable medium of claim 13, wherein the palette predictor is updated by:
adding all palette entries of a current palette as a first set of entries of the palette predictor; and
adding entries from the previous palette predictor that are not reused in the current palette as a second set of entries of the palette predictor, wherein the second set of entries are after the first set of entries.

15. The non-transitory computer readable medium of claim 13, wherein the palette predictor is updated by:
adding all palette entries of a current palette as a first set of entries of the palette predictor; and
adding palette entries from a previous palette predictor as a second set of entries of the palette predictor regardless of a value of reuse flag of a palette entry in the previous palette predictor, wherein the second set of entries are after the first set of entries.

16. The non-transitory computer readable medium of claim 13, wherein the palette predictor is updated by:
adding all palette entries of a current palette as a first set of entries of the palette predictor;
adding one or more palette entries of a previous palette predictor that is within a first range to the palette predictor as a second set of one or more entries of the palette predictor, wherein the first range starts at a first palette entry of the previous palette predictor and ends at a first palette entry of the previous palette predictor that has a reuse flag set, and adding one or more palette entries of the previous palette predictor that is within a second range to the palette predictor as a third set of one or more entries of the palette predictor, wherein the second range starts at a last palette entry of the previous palette predictor that has a reuse flag set and ends at a last palette entry of the previous palette predictor, the second set of entries and the third set of entries are after the first set of entries.

17. The non-transitory computer readable medium of claim 13 wherein the fixed number being set to 31 or 63 based on the slice type and the dual tree mode setting further comprises:

setting the fixed number to be 31 when the slice type is I-slice and the dual tree mode is on; or setting the fixed number to be 63 when the slice type is B-/P-slice or the slice type is I-slice and the dual tree mode is off.

18. A method for deblocking filter of palette mode, comprising:

receiving a video frame for processing;

generating two or more coding units for the video frame, wherein each coding unit of the two or more coding units have one or more coding blocks;

determining whether at least one of a first coding block of two neighboring coding blocks and a second coding block of the two neighboring coding blocks is coded in an intra prediction mode;

in response to the first coding block and the second coding block being not coded in the intra prediction mode, determining whether at least one of the first coding block and the second coding block is coded in an CIIP (combined inter and intra prediction) mode;

in response to the first coding block and the second coding block being not coded in the CIIP mode, determining whether at least one of the first coding block and the second coding block is coded in a palette mode; and setting a boundary filter strength to 1 in response to the first coding block being coded in palette mode and the second coding block having a coding mode different from the palette mode.

19. An apparatus for performing video data processing, the apparatus comprising:

a memory figured to store instructions; and one or more processors configured to execute the instructions to cause the apparatus to perform:

receiving a video frame for processing;

generating two or more coding units for the video frame, wherein each coding unit of the two or more coding units has have one or more coding blocks;

determining whether at least one of a first coding block of two neighboring coding blocks and a second coding block of the two neighboring coding blocks is coded in an intra prediction mode;

in response to the first coding block and the second coding block being not coded in the intra prediction mode, determining whether at least one of the first coding block and the second coding block is coded in an CIIP (combined inter and intra prediction) mode;

in response to the first coding block and the second coding block being not coded in the CIIP mode, determining whether at least one of the first coding block and the second coding block is coded in a palette mode; and setting a boundary filter strength to 1 in response to the first coding block being coded in palette mode and the second coding block having a coding mode different from the palette mode.

20. A non-transitory computer readable medium storing a bitstream of a video for processing according to a method comprising:

generating two or more coding units of a video frame, wherein each coding unit of the two or more coding units have one or more coding blocks;

determining whether at least one of a first coding block of two neighboring coding blocks and a second coding block of the two neighboring coding blocks is coded in an intra prediction mode;

in response to the first coding block and the second coding block being not coded in the intra prediction mode, determining whether at least one of the first coding block and the second coding block is coded in an CIIP (combined inter and intra prediction) mode;

in response to the first coding block and the second coding block being not coded in the CIIP mode, determining whether at least one of the first coding block and the second coding block is coded in a palette mode; and setting a boundary filter strength to 1 in response to the first coding block being coded in palette mode and the second coding block having a coding mode different from the palette mode.

* * * * *